US012554617B2

(12) United States Patent
Kumaresan et al.

(10) Patent No.: US 12,554,617 B2
(45) Date of Patent: Feb. 17, 2026

(54) CORRELATION OF TIME SERIES SIGNALS USING SHAPE IDENTIFICATION VALUES

(71) Applicant: Oracle International Corporation, Redwood Shores, CA (US)

(72) Inventors: Dhileeban Kumaresan, Foster City, CA (US); Amr Fahmy, Foxboro, MA (US); Sreeji Das, Fremont, CA (US); Venktesh Alvenkar, Hyderabad (IN); Adrienne Wong, Redwood City, CA (US)

(73) Assignee: Oracle International Corporation, Redwood Shores (CA)

( * ) Notice: Subject to any disclaimer, the term of this patent is extended or adjusted under 35 U.S.C. 154(b) by 474 days.

(21) Appl. No.: 18/312,813

(22) Filed: May 5, 2023

(65) Prior Publication Data

US 2024/0370348 A1 Nov. 7, 2024

(51) Int. Cl.
*G06F 11/34* (2006.01)
*G06F 11/30* (2006.01)

(52) U.S. Cl.
CPC ...... *G06F 11/3476* (2013.01); *G06F 11/3006* (2013.01)

(58) Field of Classification Search
CPC .......................... G06F 11/3476; G06F 11/3006
See application file for complete search history.

(56) References Cited

U.S. PATENT DOCUMENTS

| 10,713,271 | B2 | 7/2020 | Das et al. |
| 11,042,525 | B2 | 6/2021 | Das et al. |
| 11,308,250 | B2 | 4/2022 | Mehta et al. |
| 11,354,836 | B2 | 6/2022 | Kumaresan et al. |
| 12,314,150 | B1 * | 5/2025 | Anumolu ............ G06F 11/3051 |

(Continued)

FOREIGN PATENT DOCUMENTS

CN 108038049 B * 11/2021 .......... G06F 11/3452

OTHER PUBLICATIONS

"Persistent Topology For Peak Detection", Available online At: https://www.sthu.org/blog/13-perstopology-peakdetection/index.html, Sep. 2017, 5 pages.

(Continued)

*Primary Examiner* — Mi'schita' Henson
(74) *Attorney, Agent, or Firm* — Mughal Gaudry & Franklin PC

(57) ABSTRACT

Some embodiments relate to analyzing log records. A method may include determining a first shape identification value that characterizes a shape described by data points of a first time series signal that represents a time distribution of timestamps of a first plurality of messages. For each message among a second plurality of messages, the method may also include determining a shape identification value for the message that characterizes a shape described by data points of a corresponding time series signal that represents a time distribution of timestamps of a plurality of instances of the message. The method may further include determining that a shape identification value, from among the shape identification values for the second plurality of messages, is the same as the first shape identification value and, in response to the determining, providing information identifying the corresponding message to a user interface.

20 Claims, 22 Drawing Sheets

(56) References Cited

U.S. PATENT DOCUMENTS

| | | |
|---|---|---|
| 2018/0102938 A1 | 4/2018 | Yoon et al. |
| 2018/0113578 A1 | 4/2018 | Yoon et al. |
| 2019/0095508 A1* | 3/2019 | Porath ................... G06F 16/34 |
| 2019/0095510 A1* | 3/2019 | Cruise ............... G06F 16/24568 |
| 2021/0081818 A1 | 3/2021 | Fahmy et al. |
| 2022/0171794 A1 | 6/2022 | Kumaresan et al. |
| 2022/0171800 A1 | 6/2022 | Kumaresan et al. |
| 2023/0011452 A1* | 1/2023 | Barber .............. G06F 16/24558 |

OTHER PUBLICATIONS

"Topology", Available online At: https://erdogant.github.io/findpeaks/pages/html/Topology.html, Accessed from Internet on Mar. 6, 2023, 10 pages.

Edelsbrunner et al., "Computational Topology", Departments of Computer Science and Mathematics, Duke University, 2008, 294 pages.

Huber, "Persistent Homology in Data Science", Salzburg University of Applied Sciences, Jan. 2021, 8 pages.

* cited by examiner

Jan 26, 2023,
6:33:44 PM

Time: 20230127023344.7381010900
Event Generation Time: 2023-01-27T02:33:44.738Z
Event Log File: Application
Event Code:
Event ID: 1015
Event Type: 3
Record ID: 2261415
Component: MsiInstaller
Machine Name: pkgdapp02.subnet1rg2phosx.amdevinfraphx1.oraclevcn.com
Category ID: 0
Category:
Type:
User Name: NT SERVICE\OCAUM
Data:
Message: Failed to connect to server. Error: 0x80070005
Supplemental Detail:

○ i ▲   Entity = pkgdapp02.subnet1rg2phosx.amdevinfraphx1.oraclevcn.com | Entity Type = Host (Windows) | Log
Source = Windows Application Events

| Insight Field Name | Insight Field Value |
|---|---|
| Cluster Record Count | 3 |
| Shape Record Count | 3 |
| Shape Cluster Count | 1 |
| Issue | Potential |
| Cluster Trend | |

Add To Search
Exclude From Search

Jan 26, 2023,
6:02:49 PM

Time: 20230127020249.6904316
Event Generation Time: 2023-01-27T02:02:49.690Z

CORRELATION OF TIME SERIES SIGNALS USING SHAPE IDENTIFICATION VALUES

FIELD

This disclosure relates generally to log analytics. More specifically, but not by way of limitation, this disclosure relates to determining correlations among logged events.

BACKGROUND

Many types of computing systems and applications generate vast amounts of data pertaining to or resulting from the operation of that computing system or application. These vast amounts of data are stored into collected locations, such as log files (e.g., files that comprise log records), which can then be reviewed at a later time period if there is a need to analyze the behavior or operation of the system or application.

A time series dataset (also called a "time series signal") is typically represented in two dimensions: one dimension representing time and another dimension representing numerical data points. For example, a time series dataset may track processor utilization of a server over a fixed time period, where each respective data point in the dataset indicates a respective measured utilization rate at a different point in time within the time period. These data points may provide useful information about the behavior of the underlying system, such as when the processor utilization rate is prone to spikes and drop offs.

Another time series dataset may track a pattern of time-stamped occurrences of a message over a fixed time period, where each respective data point in the dataset indicates, for each time bin of a plurality of time bins within the time period, a number of instances of the message that have a timestamp within the time bin. Such a time series dataset, which represents a time distribution of the occurrences of the message over the time period, may be plotted as a histogram to provide a visual depiction of the pattern.

SUMMARY

Various embodiments of the invention include techniques configured to associate a time series dataset with a compact identification value (called a "shape identification value") that characterizes a shape described by the data points of the time series dataset over a corresponding time period. The shape identification value can be used to represent the time series dataset for purposes of comparison with other time series datasets, such as determining whether the time series dataset is correlated over time with another time series dataset. Such techniques may be used to identify correlated behaviors within a system (e.g., within a network) in a manner that is both scalable and distributed among entities in the system.

Some of the embodiments as disclosed herein provide an approach to analyzing log records that may be used to accelerate a triaging process by bypassing log records that are contemporaneous but unrelated to an event being analyzed. Other additional objects, features, and advantages of the disclosed techniques and other embodiments are described in the detailed description, figures, and claims.

In some instances, a method of analyzing log records includes identifying a message portion (e.g., a text string) and a time period. Such identifying may be performed, for example, by a query processing module of a log analytics system, which may identify the message portion and time period from information received from a user interface (e.g., as provided by a user station). The message portion and time period may be specified in a query submitted via the user interface by a user (e.g., a user of the log analytics system). In an alternative, the time period may be based on a time specified in the query (e.g., a timestamp of a reported message). In such case, identifying the time period may include identifying a start time and an end time of the time period, relative to the specified time.

In some instances, a method of analyzing log records includes obtaining, from at least one of a plurality of log files, a first plurality of messages that include the message portion and have a timestamp within the time period. Such obtaining may be performed, for example, by a query processing module of a log analytics system, which may obtain the first plurality of messages from each of one or more agents at corresponding hosts of a network, such as from a request processing module of each of the one or more agents. In response to a request from the query processing module that indicates the message portion and the time period, each of one or more of the request processing modules may retrieve messages that include the message portion and have timestamps within the time period from a corresponding one of the plurality of log files and provide the messages to the query processing module. The log files may be distributed within a network (e.g., a customer network). For example, the log files may be resident on corresponding ones of a plurality of hosts within the network.

In some instances, a method of analyzing log records includes generating a first time series signal that represents a time distribution of the timestamps of the first plurality of messages. Such generating may be performed, for example, by a query processing module of a log analytics system. The first time series signal may indicate, for each time bin of a plurality of time bins, a quantity of the first plurality of messages having a timestamp within the time bin. In such case, each of the data points of the first time series signal may correspond to a respective time bin of a plurality of time bins and indicate a quantity of the timestamps of the first plurality of messages that are within the respective time bin.

In some instances, a method of analyzing log records includes determining a first shape identification value that characterizes a shape of a first time series described by the timestamps of the first plurality of messages (e.g., a shape of the first time series over the first time period). Such obtaining may be performed, for example, by a shape identification value determining module of a log analytics system. The first shape identification value may be based on a persistence score signal of the first time series (e.g., a peak persistence score signal, a valley persistence score signal, a normalized and/or resolution-reduced version of a persistence score signal), and determining the first shape identification value may include applying a hash function to a key that is based on the persistence score signal. The method may also include displaying a graphical representation of the first shape identification value (e.g., a sparkline representation) on a display of a user interface.

In some instances, a method of analyzing log records includes, for each message among a second plurality of messages, obtaining, from at least one of the plurality of log files, a corresponding plurality of instances of the message that have a timestamp within the first time period; generating a corresponding time series signal that represents a time distribution of the timestamps of the plurality of instances of the message; and determining a shape identification value for the message that characterizes a shape of a time series described by the timestamps of the corresponding plurality of instances of the message. Such obtaining the corresponding plurality of instances of the message and generating the corresponding time series signal may be performed, for example, by a request processing module of a corresponding agent at a host in a network. For example, the request processing module may obtain the instances of the message from a corresponding log file in response to a request from the query processing module that indicates the time period. The corresponding time series signal may indicate, for each time bin of a plurality of time bins, a quantity of the corresponding plurality of instances of the message having a timestamp within the time bin. In such case, each of the data points of the corresponding time series signal may correspond to a respective time bin of a plurality of time bins and indicate a quantity of the timestamps of the corresponding plurality of instances of the message that are within the respective time bin. Such determining the shape identification value may be performed, for example, by a shape identification value determining module of the agent.

In some instances, a method of analyzing log records includes, for each of at least one message among a second plurality of messages, determining that a shape identification value is the same as the first shape identification value and, in response to the determining, providing information identifying the message to a user interface. Such determining may be performed, for example, by a shape identification value comparing module of a log analytics system, and such providing may be performed, for example, by a user interface module of the log analytics system.

In some instances, various actions and/or combinations thereof may be performed as a method. In some instances, a computer-program product tangibly embodied in a non-transitory machine-readable storage medium includes instructions configured to cause one or more data processes to perform various actions and/or combinations thereof. In some instances, a computer-implemented system includes one or more data processors and a non-transitory computer-readable storage medium containing instructions, which, when executed on the one or more data processors, cause the one or more data processors to perform actions including various actions and/or combinations thereof.

The following detailed description together with the accompanying drawings will provide a better understanding of the nature and advantages of the present disclosure.

BRIEF DESCRIPTION OF THE DRAWINGS

Illustrative embodiments are described in detail below with reference to the following drawing figures:

FIG. 12 shows an example of an expanded item in a detail area of a display of a response by a log analytics system to a query, according to certain embodiments of the present disclosure.

FIG. 14 shows an example of a result of scrolling down through the detail area in the response of FIG. 13, according to certain embodiments of the present disclosure.

DETAILED DESCRIPTION

Figure 1:
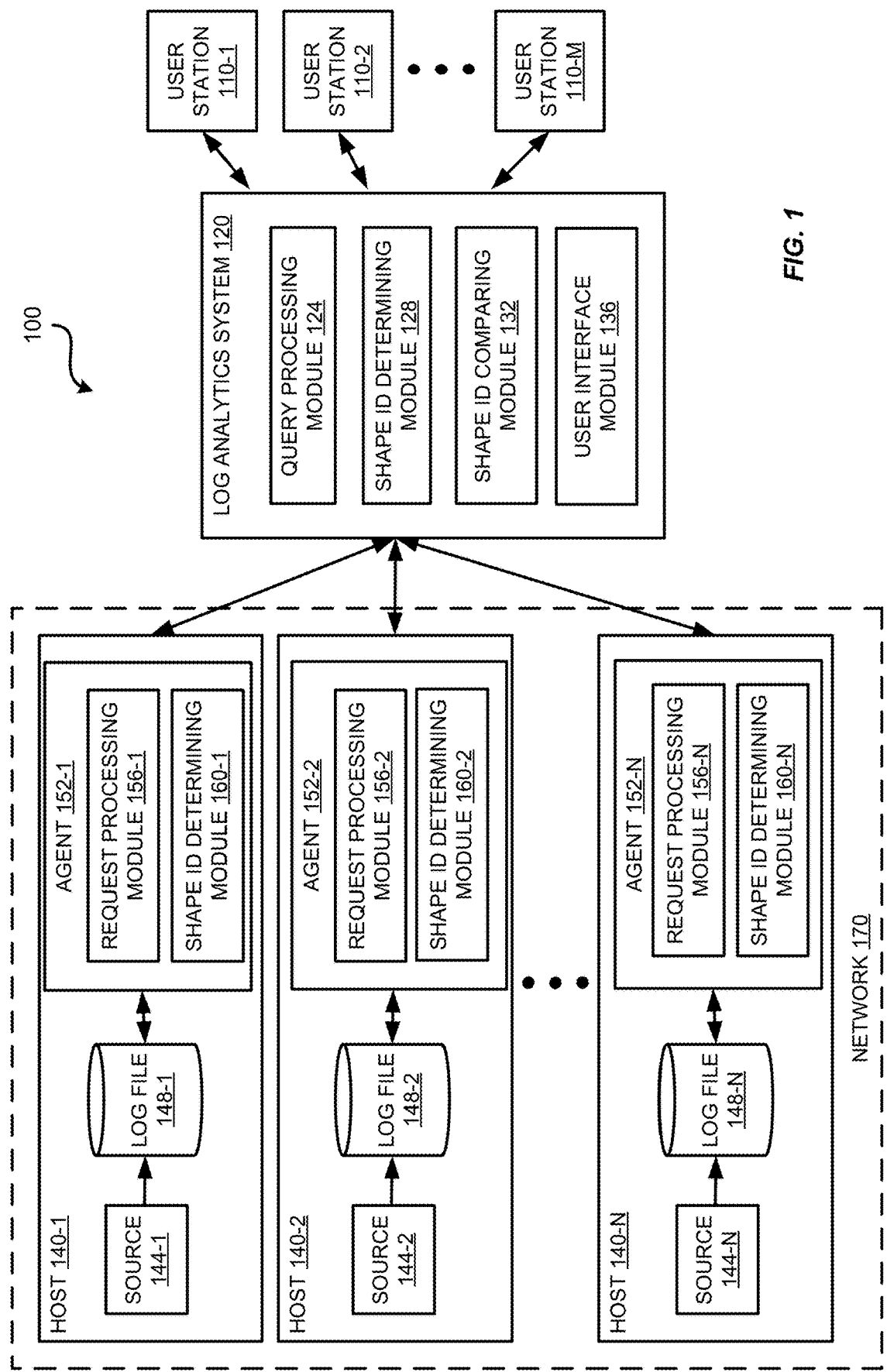
FIG. 1 illustrates an example system for analyzing log records, according to certain embodiments of the present disclosure.

In the following description, for the purposes of explanation, specific details are set forth in order to provide a thorough understanding of embodiments disclosed herein. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" or "an example" is not necessarily to be construed as preferred or advantageous over other embodiments or designs.

As used herein, when an action is "based on" something, this means the action is based at least in part on at least a part of the something. The use of "based on" is meant to be open and inclusive, in that a process, step, calculation, or other action "based on" one or more recited conditions, items, or values may, in practice, be based on additional conditions, items, or values beyond those recited. As used herein, the terms "substantially," "approximately" and "about" are defined as being largely but not necessarily wholly what is specified (and include wholly what is specified) as understood by one of ordinary skill in the art. In any disclosed embodiment, the term "substantially," "approximately," or "about" may be substituted with "within [a percentage] of" what is specified, where the percentage includes 0.1, 1, 5, and 10 percent. The use of "adapted to" or "configured to" herein is meant as open and inclusive language that does not foreclose devices adapted to or configured to perform additional tasks or steps. The use of "or" herein is also meant to be open and inclusive, in that "or" includes the meaning "and/or" unless specifically directed otherwise.

As noted above, many types of computing systems and applications generate vast amounts of data pertaining to or resulting from operation of that computing system or application. These vast amounts of data are frequently stored (e.g., as records in log files) and may be reviewed at a later time period if there is a need to analyze the behavior or operation of the system or application.

Server administrators and application administrators can benefit by learning about and analyzing the contents of the system log records. However, it can be a very challenging task to collect and analyze these records. There are many reasons for these challenges.

One significant reason pertains to the fact that many modern organizations possess a very large number of computing systems, each having numerous applications that run on those computing systems. It can be very difficult in a large system to configure, collect, and analyze log records given the large number of disparate systems and applications that run on those computing devices. Furthermore, some of those applications may actually run on and across multiple computing systems, making the task of coordinating log configuration and collection even more problematic.

Conventional log analytics tools provide rudimentary abilities to collect and analyze log records. However, conventional systems do not efficiently scale when posed with the problem of massive systems involving large numbers of computing systems having large numbers of applications running on those systems. One reason is that conventional systems often work on a per-host basis, where set-up and configuration activities are performed every time a new host is added or newly configured in the system, or where new log collection/configuration activities may need to be performed even for existing hosts. Such an approach may be highly inefficient given the extensive number of hosts that exist in modern systems. Furthermore, the conventional approaches, particularly on-premise solutions, also fail to adequately permit sharing of resources and analysis components, which may lead to significant and excessive amounts of redundant processing and resource usage.

Without limitation, techniques described herein may be employed to characterize a pattern of occurrences, over some time period, of an issue reported in log messages and to use this characterization to identify other issues (e.g., as reported in other log messages) having patterns of occurrences that are correlated in time over the same time period. For example, other occurrences of a reported "server down" message can be identified, and these occurrences may then be correlated to other messages from the same logs, as well as messages from other logs, such as the trend of "Status 50x" messages (e.g., messages indicating server error) in the access logs. The correlation may be based on time patterns of the log messages.

Without limitation, techniques described herein may also be employed to use data that is characteristic of a time series to provide a compact identification value (e.g., a numeric identification value) that characterizes a shape described by the data points of the time series signal over some time period and is reproducible given the same time series signal. Such a technique may be used to associate a time series with an identification value (called a "shape identification value" or "shape ID") that is unique to the shape being characterized and can be used to represent the time series for other purposes, such as determining whether the time series matches another time series. In one example, data that is distributed across servers in a network (for example, average response time for each server over each of a series of time bins) is collected, a time series signal is created from this collected data, and a shape identification value is used to represent the time series signal (e.g., for comparison with other metrics). In another example, each of a plurality of hosts, which may be distributed within a network, calculates a shape identification value for a corresponding time series signal that is based on data stored locally (e.g., at the host), and a similarity among the time series signals is determined with reference to the shape identification values.

In some embodiments, such techniques may be implemented to allow a user of a log analytics system to quickly jump from an alert of a known error (e.g., as reported by an end-user of a network) to the other errors in the stack that are correlated over time, bypassing millions of unrelated log messages automatically and reducing time and effort required for triaging. Techniques, as described herein, may be integrated with other log analytics tools (e.g., a query language, a clustering feature, etc.) to allow a user to perform such an operation with a few clicks.

In a non-limiting implementation of techniques as described herein, a log analytics system obtains log records to determine a pattern of occurrences of a reported message over a time period and uses shape identification values to detect one or more other logged events that each exhibit a similar pattern of occurrences over the time period. The log analytics system communicates with agents (which may be services or daemons executing on hosts that generate the log records), and the log analytics system may also communicate interactively with user devices to receive queries and provide responses.

The term "message" is used herein to refer to an alphanumeric code or other text string that is emitted by an entity or resource (called a "log source" or "source"), to a user device and/or to another entity or resource, to indicate a status and/or an error. The term "message portion" is used herein to refer to a portion (e.g., a substring) of a message, such as a portion that identifies the status and/or error.

Examples of a source may include a software deployment such as a database application (DB App), a middleware application, a database management system (DBMS), an operating system (e.g., a version of Windows or Linux), a Windows application, a web server, or some other software resource executing on a network host. Additionally or alternatively, a source may be a hardware resource, an environmental characteristic, or some other physical resource (e.g., a peripheral or other component of a network host) for which metrics may be measured and tracked.

In some embodiments, sources are different entities that are used in or are otherwise part of an application. For example, sources may include load balancers, web servers, software components, application servers, middleware servers, network hosts, databases, database servers, storage servers, and/or other computing resources used to provide an email application, social media application, or some other cloud-based service. The number and types of resources deployed may vary from one application to the next. Further, applications may evolve over time to add, upgrade, migrate, and/or remove resources.

The term "log file" is used herein to refer to a digital file that stores a plurality of log records. A log record is an entry in a log file that includes a message and a timestamp of the message that indicates the time at which the message was emitted by the corresponding source. The log records may be stored to the log file by the source or by another entity or component (e.g., by an agent).

Referring now to the drawings, FIG. 1 is an example of a computing environment 100 in which a log analytics system 120 is configured to communicate with a plurality of log analytics agents (or "agents") 152-1 to 152-N to obtain messages and shape identification values. The agents 152-1 to 152-N may be services or daemons that execute on corresponding hosts 140-1 to 140-N of a network (e.g., a customer network) 170 and access one or more log files to retrieve log records.

The log analytics system 120 comprises functionality that is accessible to users at the user stations 110-1 to 110-M and may be implemented as a set of modules (whether hardware, software, or a mixture of hardware and software) to perform configuration, collection, and analysis of log data. The log analytics system 120 includes a query processing module 124 configured to receive queries from user stations 110-1 to 110-M and to obtain corresponding messages and shape identification values from the agents 152-1 to 152-N. The query processing module 124 may communicate with the agents 152-1 to 152-N via edge services. The log analytics system also includes a shape identification value determining module 128 configured to calculate shape identification values from time series signals that are based on timestamps of the messages, a shape identification value comparing module 132 to determine matches among shape identification values, and a user interface module 136 to receive data (e.g., queries) from and provide data (e.g., results) to a user interface (e.g., as provided by each of user stations 110-1 to 110-M).

In some embodiments, the log analytics system 120 is embodied as a cloud-based and/or SaaS-based (software as a service) architecture. For example, the log analytics system 120 may provide log analytics functionality as a service on a hosted platform, such that each customer that needs the service does not need to individually install and configure the service components on the customer's own network. In such embodiments, the log analytics system 120 may be capable of providing the log analytics service to multiple separate customers and may be scalable to service any number of customers.

The environment 100 may include one or more user stations 110-1 to 110-M, each providing a user interface through which users may operate and interact with the log analytics system 120 (e.g., via the user interface module 136). For example, users at the user stations 110-1 to 110-M may receive tickets (e.g., reports of problems from end-users of network 170) and communicate interactively with the log analytics system 120 by issuing queries to be processed by the log analytics system 120 and receiving corresponding results. Each of the user stations 110-1 to 110-M may comprise any type of computing station that may be used to operate or interface with the log analytics system 120 in the environment 100. Examples of such user stations include, for example, workstations, personal computers, mobile devices, or remote computing terminals. Each of the user stations 110-1 to 110-M may comprise a display device, such as a display monitor, for displaying a graphical user interface (GUI) to users at the user station. Each of the user stations 110-1 to 110-M may also comprise one or more input devices for the user to provide input to the log analytics system 120, such as a keyboard to enter text and/or a mouse to manipulate a pointing object in the GUI to generate user inputs. In some embodiments, one or more of the user stations 110-1 to 110-M may be located within the customer network 170.

The log analytics system 120 may include a user interface (UI) module 136 that receives information (e.g., queries) from and provides information (e.g., classification and analysis results) to one or more user interfaces (e.g., as provided by user stations 110-1 to 110-M) for allowing a user to interact with the log analytics system 120 via a user station. Examples of a user interface include a GUI, a command line interface (CLI), a haptic interface, a voice command interface, and an application programming interface (API). Examples of elements of a user interface for receiving user input include checkboxes, radio buttons, dropdown lists, list boxes, buttons, toggles, text fields, date and time selectors, command lines, sliders, pages, and forms. User interface module 136 may automatically filter, sort, and/or otherwise organize data points within a time series signal as a function of the query results. In one example, user interface module 136 includes a server that specifies elements of a display of the user interface (e.g., via HTTP responses) to a web browser of the user station, which renders the display as a web page.

The network 170 may include any number of hosts 140-1 to 140-N, which are computing platforms within the network 170. Each of the hosts 140-1 to 140-N may operate as a server providing information resources (e.g., data), services, and/or applications to user devices or to other hosts on the network. Each of the hosts 140-1 to 140-N includes a corresponding one of sources 144-1 to 144-N that emit messages (e.g., to user devices of the network 170), and a host may include more than one source. Each of the hosts 140-1 to 140-N also includes a corresponding one of agents 152-1 to 152-N, which may be a service or daemon that executes on the host and accesses one or more log files to retrieve log records. Each of the sources 144-1 to 144-N may store log records of the emitted messages to a corresponding one of the log files 148-1 to 148-N, or the corresponding agent of the host may collect the messages and store the log records.

For each of the hosts 140-1 to 140-N, the corresponding one of the log files 148-1 to 148-N may be stored locally (e.g., in a storage medium of the host). Alternatively or additionally, the log files 148-1 to 148-N may be stored in one or more file systems and/or search platforms that may be accessed by the hosts 140-1 to 140-N (e.g., by the agents 152-1 to 152-N) and possibly by the log analytics system.

One example of such a file system that may be used to store the log files 148-1 to 148-N is a Hadoop Distributed File System (HDFS) cluster. An HDFS cluster can include many (e.g., thousands) of servers to host storage (e.g., directly attached storage) and execute tasks, such as tasks defined by user applications, and the log files 148-1 to 148-N can be divided into blocks to be stored at multiple data nodes of the HDFS cluster. An HDFS cluster can include a master/slave architecture with a single master server for managing a namespace of the cluster. The master server can perform file operations (e.g., open, close, etc.) on the log files 148-1 to 148-N and determine which blocks are to be stored on which data nodes. The master server can communicate with data nodes for requests to read or write data in response to receipt of corresponding file operations.

One example of such a search platform that may be used to store the log files 148-1 to 148-N is an Apache™ open source local search platform, such as a SOLR cluster. A SOLR cluster can use a search library to perform full-text indexing and searching of data stored in an HDFS cluster (e.g., an HDFS cluster as described above). The SOLR cluster can provide APIs compatible with various languages to interface the searching functions with other programs and applications. Indexing can be performed in near real-time. The cluster can operate on a set of servers so as to facilitate fault tolerance and availability. Indexing and search tasks can be distributed across the set of servers.

Each of the agents 152-1 to 152-N may also include one or more other components, such as a corresponding one of shape identification value determining modules 156-1 to 156-N that characterizes a shape described by a time series dataset over a corresponding time period. The network 170 may include one or more gateways through which the agents 152-1 to 152-N communicate with the log analytics system 120 (e.g., via an edge services component of the log analytics system 120). In response to a query from the log analytics system 120, for example, an agent may retrieve matching log records and provide information from the records to the log analytics system 120. In response to a command from the log analytics system 120 that specifies a time period, an agent may determine a corresponding time series dataset for each of a plurality of messages logged within that time period, determine a corresponding shape identification value for each of the time series datasets, and provide the shape identification values to the log analytics system 120.

Although only one agent and one source is illustrated per host in FIG. 1, the number of agents and/or sources per host may vary from implementation to implementation. Multiple agents may be installed on a given host to monitor different sources of time series data. In other cases, a single agent may monitor multiple resources locally on the same host or remotely across multiple hosts.

One of the key use cases for log analytics is to troubleshoot a reported issue. For example, a user may file a ticket to report that they received an error message while accessing a website, and an operations team may be tasked to diagnose the problem and determine the root cause of the reported error. At the start of the process, the initial information from which to proceed may be limited. For example, the operations team may have only the error message and perhaps an approximate time at which the error message was received.

The diagnosis may begin by searching the log files of the various hosts, within some window around the time at which the error message was received, for log records that include other instances of the error message. These log records may then be used to identify the subsystem that emitted the error message, and the next step may be to determine what else might have happened around that time to cause that subsystem to indicate the error.

Several or tens of services may be running behind the subsystem, and these services may be arranged in layers, such that the root cause of the issue which gave rise to the error message may be obfuscated among those services and layers. In order to get a complete picture of the issue for root cause analysis, therefore, the operations team may analyze all of the log records that were created around the time of the error. In a complex system, the total number of log records that were generated within that time window may be in the millions or even billions, and it may be difficult to identify log records that are related to the issue. Typically a major part of the process of root cause analysis is triaging to bypass unwanted log records.

Among the contemporaneous log records, one or more events that may have caused the reported issue may eventually be identified. In one example, a user device may receive an error message "unable to process the request" from a middleware server, and the underlying cause of the middleware server failure may be identified to be a problem with a database. Further analysis may determine that the underlying cause of the database problem, and thus the root cause of the reported error, was an issue with a storage used by the database, which has no apparent relation to the error message originally received by the user device.

As noted above, a large part of the diagnosis process is reducing the number of log records to be considered, starting with only a small bit of information. Without limitation, techniques described herein may be employed to perform such triaging in an effective manner by identifying messages that have a similar pattern of occurrence over the time period. In one example, the log analytics system 120 queries the various agents 152-1 to 152-N, requesting them to return each log record (or at least the corresponding message and timestamp) that contains the message text and occurred within the designated time period. The log analytics system 120 aggregates the results to produce a time series signal (which may include multiple clusters) and determines a corresponding first shape identification value. The log analytics system 120 commands the various agents 152-1 to 152-N to return corresponding shape identification values for other messages having timestamps within the designated time period, and the log analytics system 120 determines whether any of these shape identification values are the same as the first shape identification value. Messages whose shape identification values are the same as the first shape identification value may be displayed for further analysis, while other messages logged within the time period whose shape identification values are different than the first shape identification value may be omitted from further consideration.

Figure 2:
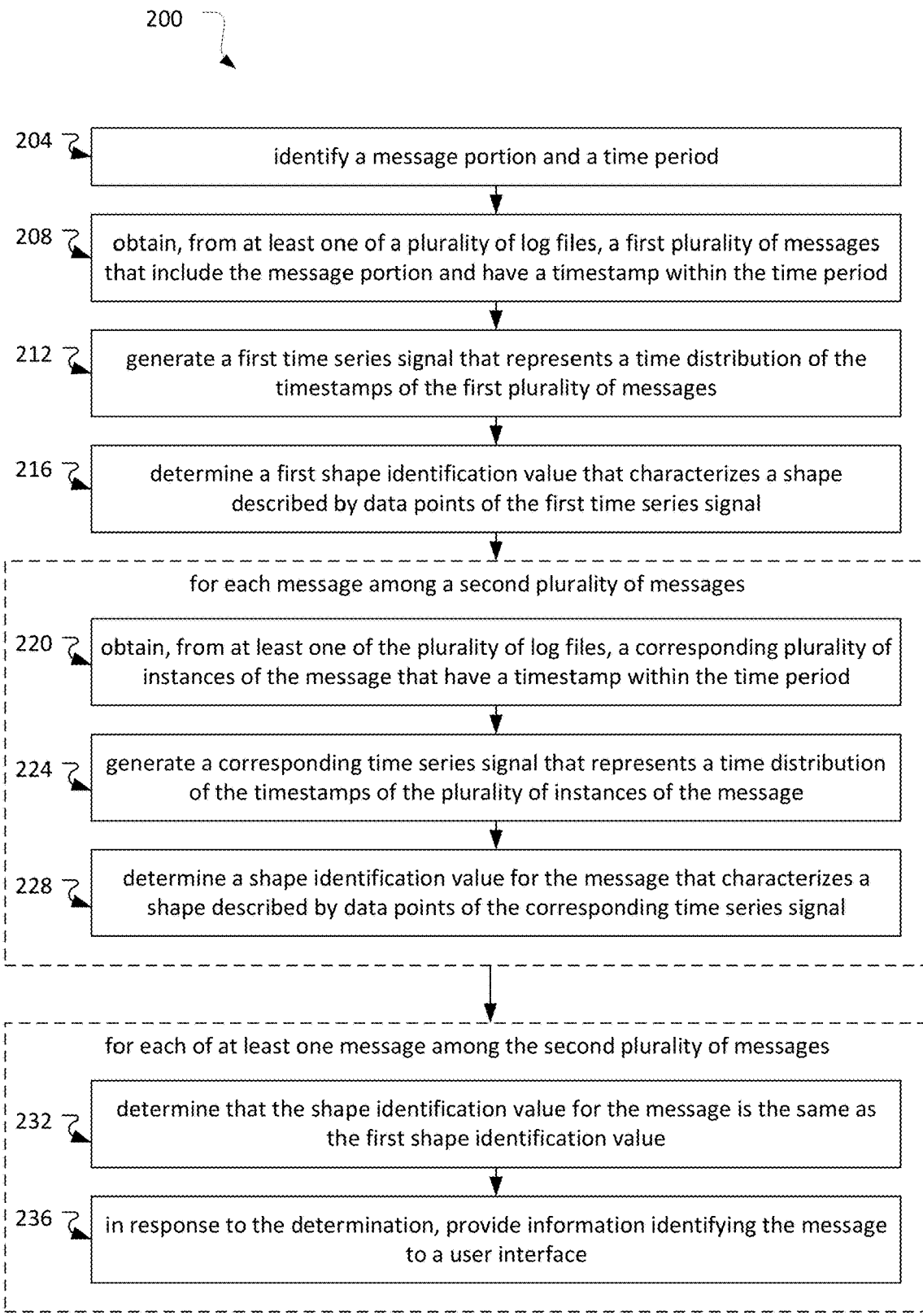
FIG. 2 shows a flowchart of a process for analyzing log records, according to certain embodiments of the present disclosure.

FIG. 2 depicts a process 200 of analyzing log records, according to certain embodiments of the present disclosure. One or more processing devices (e.g., one or more computing devices) implement operations depicted in FIG. 2 by executing suitable program code. For example, process 200 may be executed by an instance of the log analytics system 120 and a plurality of agents 152-1 to 152-N. For illustrative purposes, the process 200 is described with reference to certain examples depicted in the figures. Other implementations, however, are possible.

In block 204, the process 200 includes identifying a message portion (e.g., a text string) and a time period. Such identifying may be performed, for example, by the query processing module 124, which may identify the message portion and time period from information received from a user interface (e.g., from one of the user stations 110-1 to 110-M). The message portion and time period may be specified in a query submitted via the user interface by a user (e.g., a user of the log analytics system 120), and examples in which the query processing module 124 receives the message portion and time period from a command-line query and drop-down menu are described below. In an alternative, the time period may be based on a time specified in the query (e.g., a timestamp of a reported message). In such case, identifying the time period may include identifying a start time and an end time of the time period, relative to the specified time (e.g., a start time that is one, two, or three hours before the specified time, and an end time that is one, two, or three hours after the specified time).

In block 208, the process 200 includes obtaining, from at least one of a plurality of log files, a first plurality of messages that include the message portion and have a timestamp within the time period. Such obtaining may be performed, for example, by the query processing module 124, which may obtain the first plurality of messages from one or more of the request processing modules 156-1 to 156-N of each of the one or more agents 152-1 to 152-N. In response to a request from the query processing module 124 that indicates the message portion and the time period, each of one or more of the request processing modules may retrieve messages that include the message portion and have timestamps within the time period from a corresponding one of the log files 148-1 to 148-N and provide the messages to the query processing module 124. The log files may be distributed within a network. For example, the log files may be resident on corresponding ones of hosts 140-1 to 140-N.

In block 212, the process 200 includes generating a first time series signal that represents a time distribution of the timestamps of the first plurality of messages. Such generating may be performed, for example, by the query processing module 124. The first time series signal may indicate, for each time bin of a plurality of time bins, a quantity of the first plurality of messages having a timestamp within the time bin. In such case, each of the data points of the first time series signal may correspond to a respective time bin of a plurality of time bins and indicate a quantity of the timestamps of the first plurality of messages that are within the respective time bin.

In block 216, the process 200 includes determining a first shape identification value that characterizes a shape of a first time series described by the timestamps of the first plurality of messages (e.g., a shape of the first time series over the first time period). Such obtaining may be performed, for example, by the shape identification value determining module 128. The first shape identification value may be based on a persistence score signal of the first time series (e.g., a peak persistence score signal, a valley persistence score signal, a normalized and/or resolution-reduced version of a persistence score signal), and determining the first shape identification value may include applying a hash function to a key that is based on the persistence score signal. The process 200 may include displaying a graphical representation of the first shape identification value (e.g., a sparkline representation) on a user interface display. Displaying the graphical representation may further include displaying an identification value on the user interface display (e.g., in response to a hover of a user input device, such as a mouse, on the graphical representation). For example, displaying the graphical representation may include displaying the sparkline representation and, in response to a mouse hover on the sparkline representation, further displaying the first shape identification value (e.g., at a location of the mouse cursor).

For each message among a second plurality of messages, the process 200 includes: in block 220, obtaining, from at least one of the plurality of log files, a corresponding plurality of instances of the message that have a timestamp within the first time period; in block 224, generating a corresponding time series signal that represents a time distribution of the timestamps of the plurality of instances of the message; and, in block 228, determining a shape identification value for the message that characterizes a shape of a time series described by the timestamps of the corresponding plurality of instances of the message. Such obtaining the corresponding plurality of instances of the message and generating the corresponding time series signal may be performed, for example, by the request processing module of a corresponding one of the agents 152-1 to 152-N. For example, the request processing module may obtain the instances of the message from a corresponding log file in response to a request from the query processing module 124 that indicates the time period. The corresponding time series signal may indicate, for each time bin of a plurality of time bins, a quantity of the corresponding plurality of instances of the message having a timestamp within the time bin. In such case, each of the data points of the corresponding time series signal may correspond to a respective time bin of a plurality of time bins and indicate a quantity of the timestamps of the corresponding plurality of instances of the message that are within the respective time bin. Such determining the shape identification value may be performed, for example, by the corresponding one of the shape identification value determining modules 156-1 to 156-N of the agent.

For each of at least one message among a second plurality of messages, the process 200 includes, in block 232, determining that the shape identification value for the message is the same as the first shape identification value and, in block 236 and in response to the determining, providing information identifying the message to a user interface. Such determining may be performed, for example, by the shape identification value comparing module 132, and such providing may be performed, for example, by the user interface module 124 of the log analytics system 120.

Figure 3:
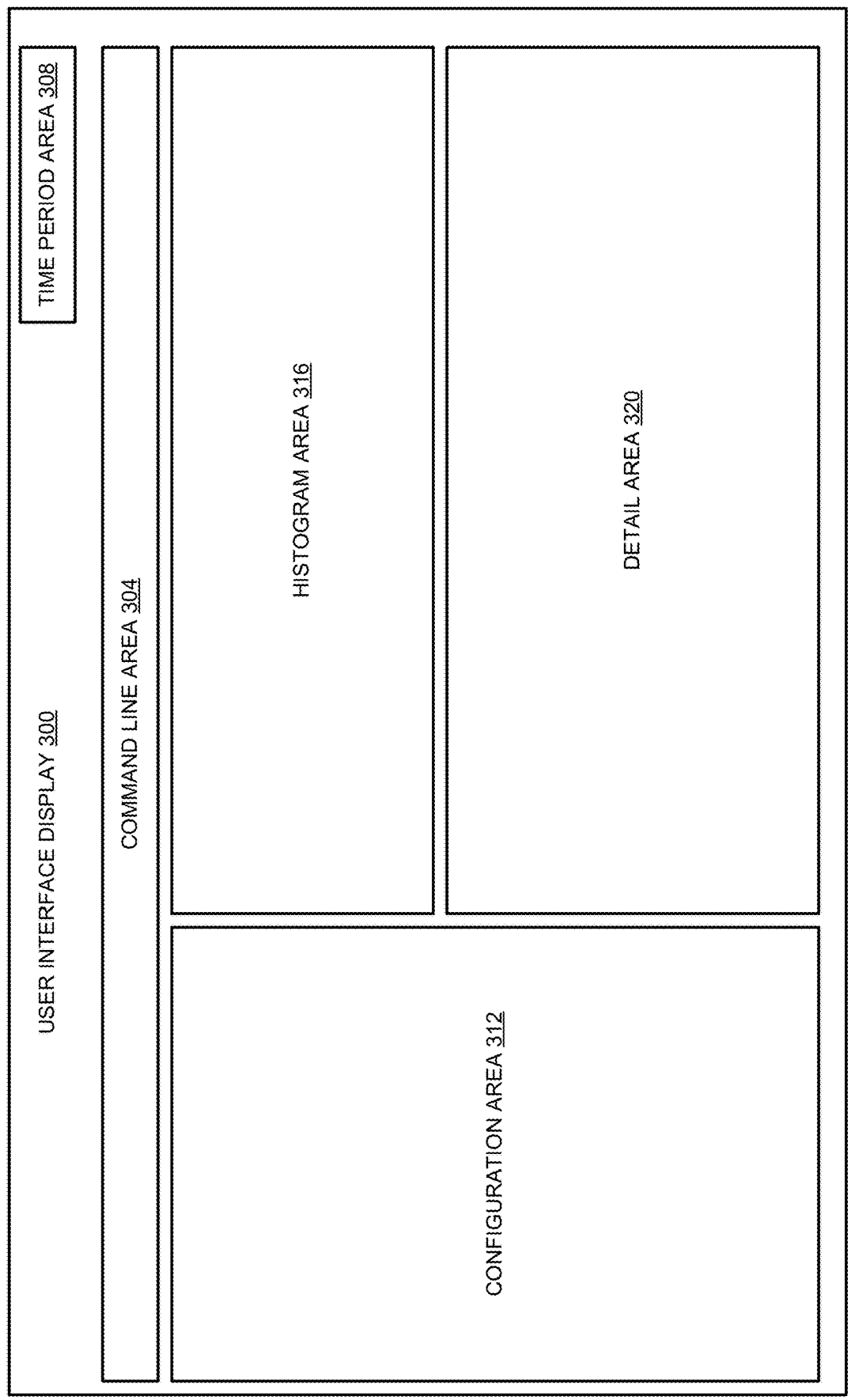
FIG. 3 shows one example of a layout for a display of a user interface for a log analytics system, according to certain embodiments of the present disclosure.

Examples of application and use of an embodiment of a log analytics system as described herein (e.g., an instance of log analytics system 120 in communication with a plurality of agents 152-1 to 152-N) are now described with reference to FIGS. 3-14. FIG. 3 shows one example of a layout for a display 300 of a user interface for the log analytics system (e.g., may be as presented on a display of a user station, such as one of the user stations 110-1 to 110-M). In this non-limiting example, the display 300 includes a command line area 304, a time period area 308, a configuration area 312, a histogram area 316, and a detail area 320. It will be understood that other examples of such a layout may include more or fewer interface elements (e.g., the command line and time period areas may be merged, or one or both may be split into sub-elements; the histogram area may be absent; the configuration area may be presented on another display; etc.), which may be arranged at different locations of the display than as shown in this example.

Figure 4:
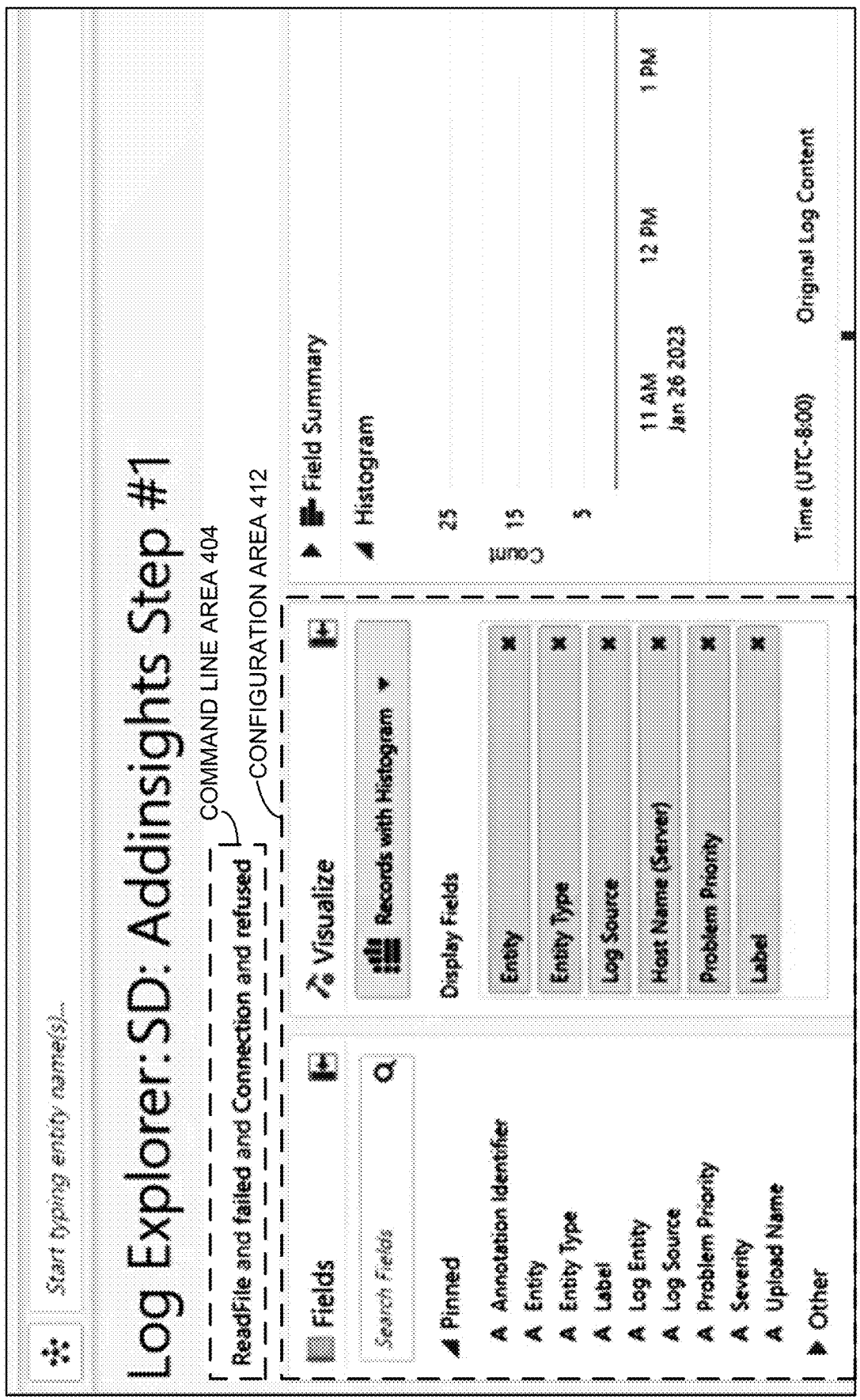
FIGS. 4 and 5 show upper-left-hand and upper-right-hand corner portions, respectively, of a screenshot of one example of a display of a user interface, according to certain embodiments of the present disclosure.
Figure 5:
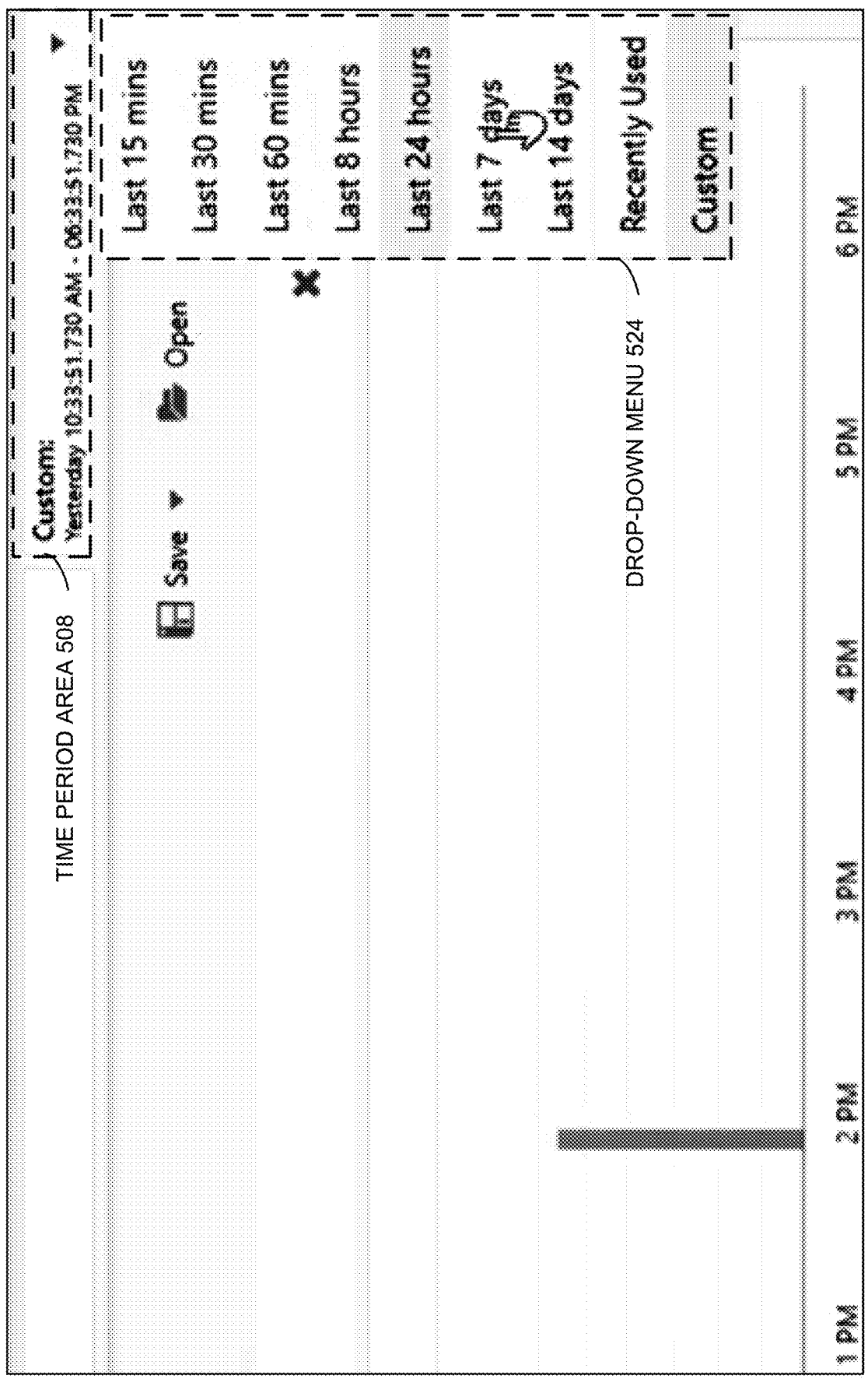

FIGS. 4 and 5 show upper-left-hand and upper-right-hand corner portions, respectively, of a screenshot of one example of a display 300 of the user interface. FIG. 4 shows a command line area 404 with the query 'ReadFile and failed and Connection and refused' and a configuration area 412 with sub-areas for selection of fields and visualizations. FIG. 5 shows a time period area 508 with a drop-down menu 524 for time period selection.

FIGS. 6-14 show portions of screenshots of user interface display 300 with examples of results provided by the log analytics system in response to various user queries and commands, and a first example of a root cause analysis using log analytics is now discussed with reference to FIGS. 6-10. In this example, a user of the log analytics system (e.g., using one of the user stations 110-1 to 110-M) is investigating a ticket reporting that the error message 'ReadFile failed Connection refused' was received sometime in the afternoon on Jan. 26, 2023. Such a report might have been submitted, for example, by an end-user of the network 170

(e.g., a user of a client of a service provided by one or more of the hosts 140-1 to 140-N, a customer of a cloud service hosted on the network 170, etc.).

Figure 6:
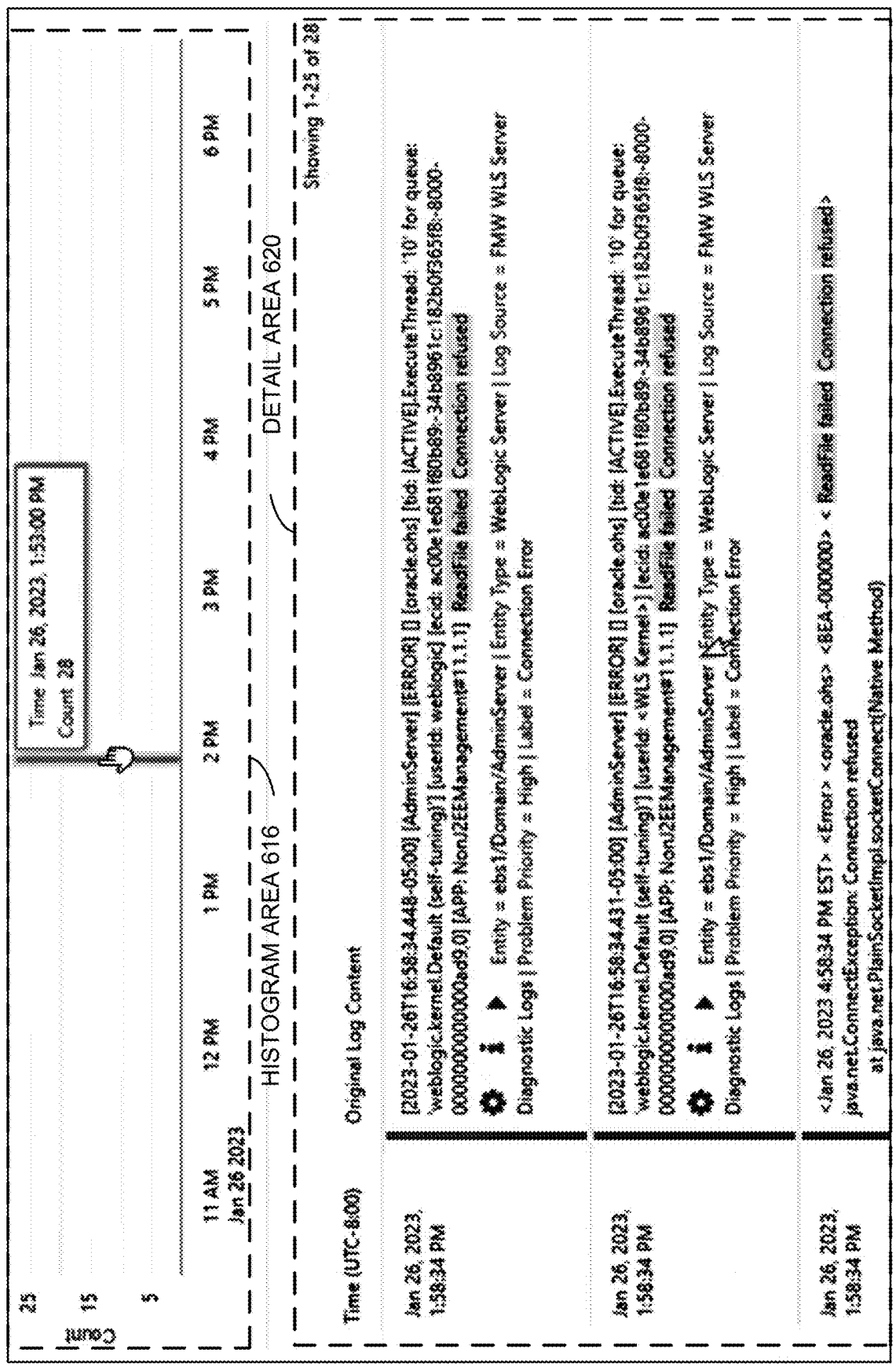
FIG. 6 shows histogram and detail areas of an example of a display of a response by a log analytics system, according to certain embodiments of the present disclosure.

FIG. 6 shows histogram and detail areas 616 and 620, respectively, of an example of a user interface display of a response by the log analytics system to a query on the message portion 'ReadFile failed Connection refused' over the time period from 10:34 AM to 6:34 PM on Jan. 26, 2023. In one user interface example, the user of the log analytics system enters the query by typing the message portion in a command line area of the user interface display:

'ReadFile failed Connection refused' and specifying the time period in another element of the user interface display (e.g., as shown in FIG. 5). In response to this query, the log analytics system may in turn query each of the various agents for any matching log records among their respective log files.

Among the various log files in a typical network, the total number of log records that have timestamps within such a time period may be in the thousands, millions, or even billions. The response by the log analytics system as shown in FIG. 6 indicates that 28 matching messages (that is, 28 messages which include the message portion and have timestamps within the specified time period) were found. (In this context, the timestamp of a message is also considered to be the timestamp of the corresponding log record.) As shown in the histogram, the timestamps of the matching messages indicate that all 28 instances of this message occurred around 1:53 PM local time.

It may be desired for the log analytics system to provide the user with a further indication of how the matching log records are related to each other. For example, the log analytics system may perform a clustering operation to determine a similarity among log records and group the log records accordingly. Disclosure of examples of techniques for such clustering of log records may be found in US 2018/0102938 A1 (Yoon et al.) and US 2022/0171800 A1 (Kumaresan et al.), which are incorporated by reference herein for the purpose of providing such disclosure. In one example, the log analytics system may determine that log records are similar to one another if they include the same message and were emitted by the same log source (or are stored in the same log file). In another example, the clustering operation may use grammar rules and/or machine learning to determine which log records in the set of matching log records are similar to one another. Performing clustering at this stage of the analysis may reduce the total number of log entries to be considered and may also help to distinguish outliers.

Figure 7:
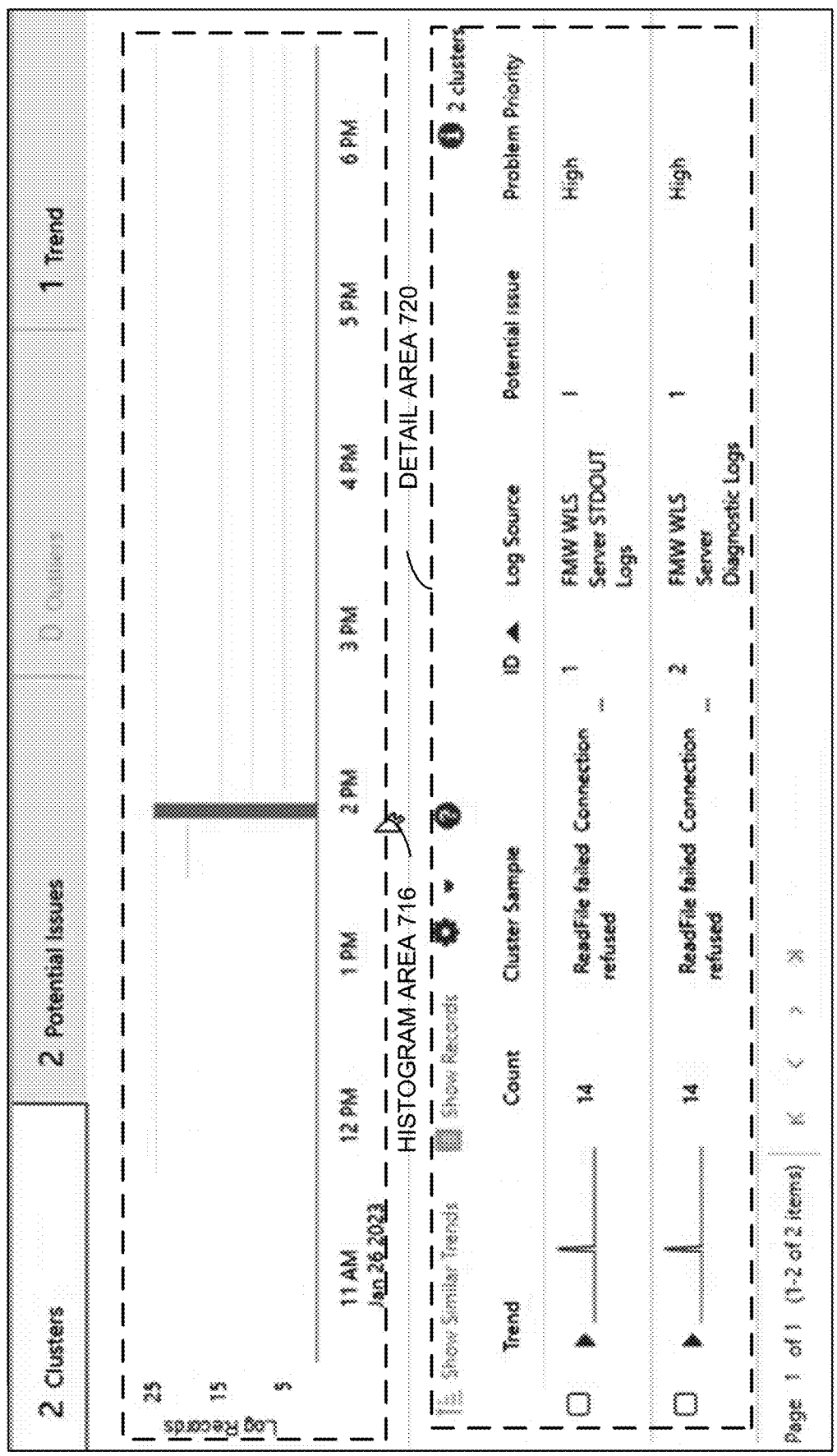
FIG. 7 shows histogram and detail areas of an example of a display of a response by a log analytics system to a query, according to certain embodiments of the present disclosure.

FIG. 7 shows an example of a display (including a histogram area 716 and a detail area 720) of a response by the log analytics system to a query, as described with reference to FIG. 6, to which a command to perform clustering has been added. For example, the query may appear as follows:

'ReadFile failed Connection refused'|cluster

As shown in the detail area 720 in FIG. 7, the clustering operation has divided the set of 28 matching messages into two clusters. Each cluster contains 14 records, all of the messages in one cluster were retrieved (e.g., by a corresponding agent) from Fusion Middleware (FMW) WebLogic Server (WLS) Server STDOUT (standard output) logs, and all of the messages in the other cluster were retrieved from FMW WLS Server diagnostic logs. The column labeled 'Count' shows a cluster record count value which indicates, for each cluster, how many of the 28 matching messages were assigned to the cluster (e.g., how many of the 28 matching messages were determined to satisfy the similarity criterion or criteria that define the cluster, such as message, log source, log file, etc.). Other columns of the detail area 720 of the display as illustrated in FIG. 7 show, for each cluster, a sample from a message in the cluster (e.g., a message that is representative of the records in the cluster), a unique numeric cluster identification value, the log source that generated the messages, and a probable severity of the reported issue. The display also shows that the messages indicate a high problem priority. The root cause of the issue, however, is not yet indicated.

The display shown in FIG. 7 also includes a column labeled 'Trend' that displays a sparkline representation of a shape described by the data points of a time series signal that represents a time distribution of the timestamps of the messages in the cluster over the specified time period. In this example, the shape indicates a single spike of activity at a particular point within the time period.

Figure 8:
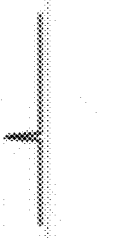
FIG. 8 shows a detail area of an example of a display of a response by a log analytics system to a query, according to certain embodiments of the present disclosure.

FIG. 8 shows an example of a detail area of a display of a response by the log analytics system to a query, as described with reference to FIG. 6, to which a command to activate an expansion functionality has been added. For example, the user may activate the functionality by including an 'addinsights' command, such that the query may appear as follows:

'ReadFile failed Connection refused'|addinsights

In this example, the first list item in the response as shown in FIG. 6 has been expanded to show corresponding values for the following parameters: cluster record count, shape record count, shape cluster count, issue, and cluster trend. As noted above, the cluster record count value indicates how many of the messages matching the query were assigned to a cluster and the cluster trend value is a sparkline representation of a shape described by the data points of a time series signal of the cluster over the specified time period (e.g., a time series signal that represents a time distribution of the timestamps of the messages in the cluster). The shape cluster count value indicates the number of clusters that have the same shape, and the shape record count value indicates the total number of records in those clusters. The issue value indicates a relative priority of the reported issue, which may be indicated by the log record (e.g., whether the message includes keywords that are considered as potential issues). For example, the log analytics system may assign an issue value of 'High' in response to detecting the presence of one or more specified keywords in the message (e.g., "error", "fail", "unable", "abort").

A next step in the root cause analysis may be to search among other events that were logged within the specified time period and identify any behaviors that are correlated over time with the instances of the reported message. One approach may be for the log analytics system to obtain, from the various agents, all of the log records that have timestamps within the specified time period and to group these records by message. In order to determine which of these messages may be correlated with the reported message over the specified time period, the log analytics system may then determine whether each group of messages is correlated with the results of the initial query. For example, the log analytics system may determine, for each group, whether a time series signal that represents a time distribution of the timestamps of the records in the group is correlated with a time series signal that represents a time distribution of the timestamps of the log records matching the original query.

One problem with this approach is that calculating a correlation among two time series signals of length N typically requires on the order of N-squared comparisons.

Consequently, this computationally expensive operation does not scale well to perform large numbers of correlations. As noted above, the total number of log records that have timestamps within the time period under consideration may be in the thousands, millions, or even billions. It may be impractical to use time-series signal correlation to search for similar behaviors among such a large number of groups of log records, and it may be desired instead to identify correlated behaviors in a manner that is scalable.

Another problem with this approach is that having the log analytics system obtain, group, and process all of the log records from the specified time period may produce other undesired effects, such as a large amount of network traffic directed to the log analytics system and a concentration of the computational burden at the log analytics system. It may be desired instead to identify correlated behaviors in a manner that is distributed among entities in the network.

Alternative approaches as described herein include associating a time series signal with a compact and unique identification value (called a "shape identification value") that characterizes a shape described by the data points of the time series signal and can be used to represent the time series signal for other purposes, such as determining whether the time series signal matches another time series signal. (Examples of algorithms that may be used to calculate a shape identification value are described in further detail below with reference to FIGS. 15-19.) Such an approach may be used to identify correlated behaviors in a manner that is both scalable and distributed among entities in the network.

In one example as applied to this analysis, the log analytics system calculates a reference shape identification value that characterizes a shape described by the data points of the time series signal that represents a time distribution of the timestamps of the 28 records matching the initial query as shown in FIG. 6 (e.g., a shape as represented by the sparkline in FIG. 7). The log analytics system also requests each of a plurality of agents to provide shape identification values for other activities within the specified time period. In response to this request, each agent groups (e.g., clusters) the log records, from its log file or files, that have timestamps within the specified time period. For example, the agent may group the log records according to message and possibly according to one or more further criteria as well (e.g., the source of the log record, the log file in which the log record is stored). For each group of records, the agent calculates a corresponding shape identification value that characterizes a shape described by the data points of a time series signal that represents a time distribution of the timestamps of the log records in the group over the specified time period. The agents provide the shape identification values to the log analytics system, and the log analytics system compares each shape identification value to the reference shape identification value to determine a similarity among the corresponding time series (e.g., to determine whether the group of records corresponding to the shape identification value is correlated over time with the set of records matching the initial query). In this manner, the burden of processing the large pool of log records from the specified time period is distributed among network entities, and the costly process of comparing the values of one time series to each of the values in another time series is avoided. As noted above, examples of algorithms that the log analytics system and the agents may execute to calculate a shape identification value are described in further detail below with reference to FIGS. 15-19.

Figure 9:
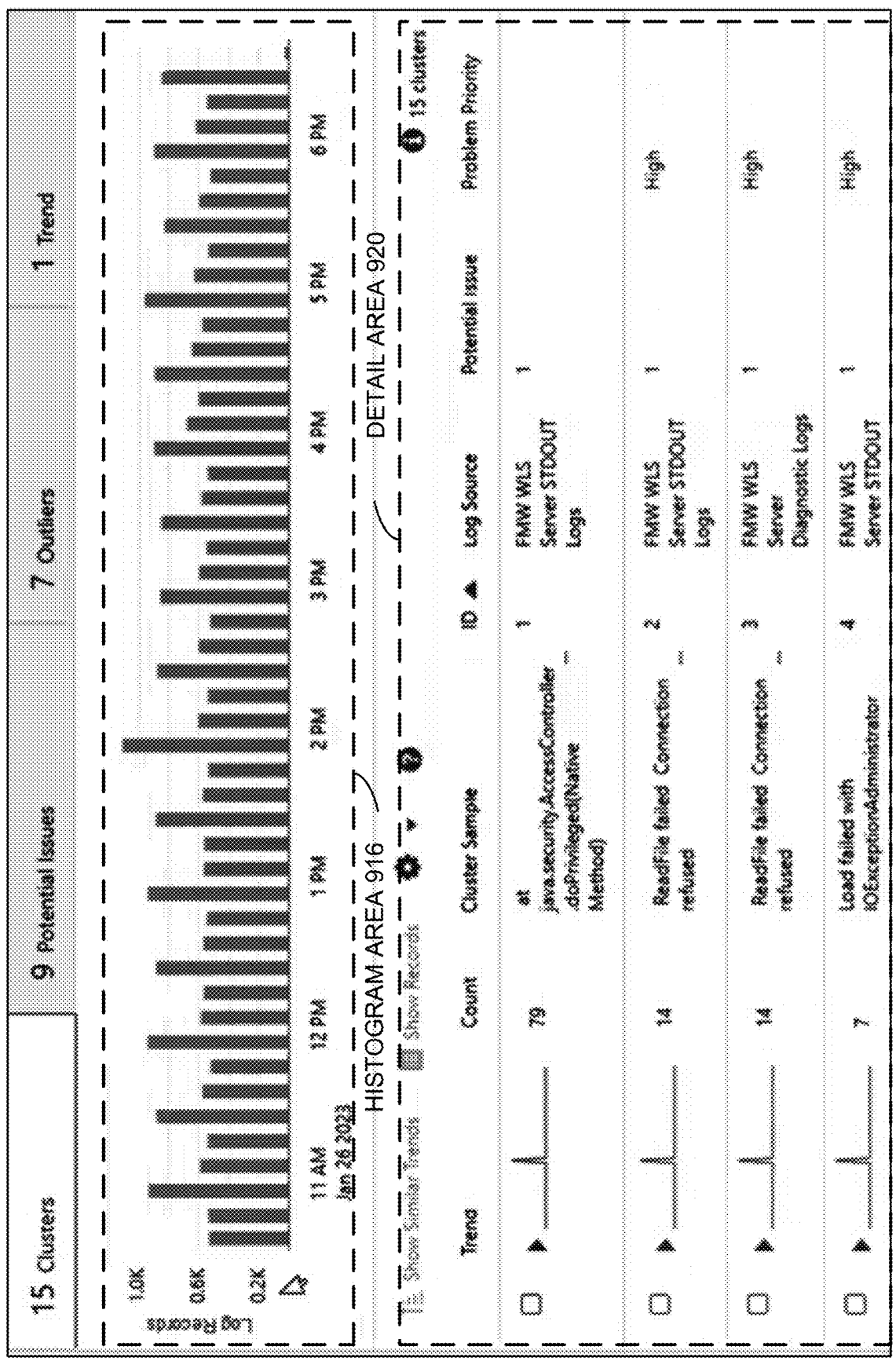
FIG. 9 shows histogram and detail areas of an example of a display of a response by the log analytics system to a query, according to certain embodiments of the present disclosure.

FIG. 9 shows an example of a display (including a histogram area 916 and a detail area 920) of a response by the log analytics system to a query, over all log records having timestamps within the same specified time period, on the shape identification value associated with the sparkline shown in FIG. 8. In this example, the query also includes a command to cluster the results as described above, and the query may appear as follows:

> *| cluster | where 'Shape $ID$' = $-826846500$

The user interface may be configured to add the shape identification value to the query automatically in response to a click by the user on the sparkline.

The response in FIG. 9 shows that fifteen clusters of log records that have the same shape identification value were found among the log files. Essentially, the large pool of log records that have timestamps within the specified time period has been reduced to only fifteen items for user review. FIG. 9 also shows that the sample messages of these clusters include messages that are completely different from each other. By reviewing such a response, the user might be able to determine that the 'Connection refused' error happened because of an I/O exception, the exception happened at a particular component, the exception occurred because something was down caused by a load, and so on.

Figure 10:
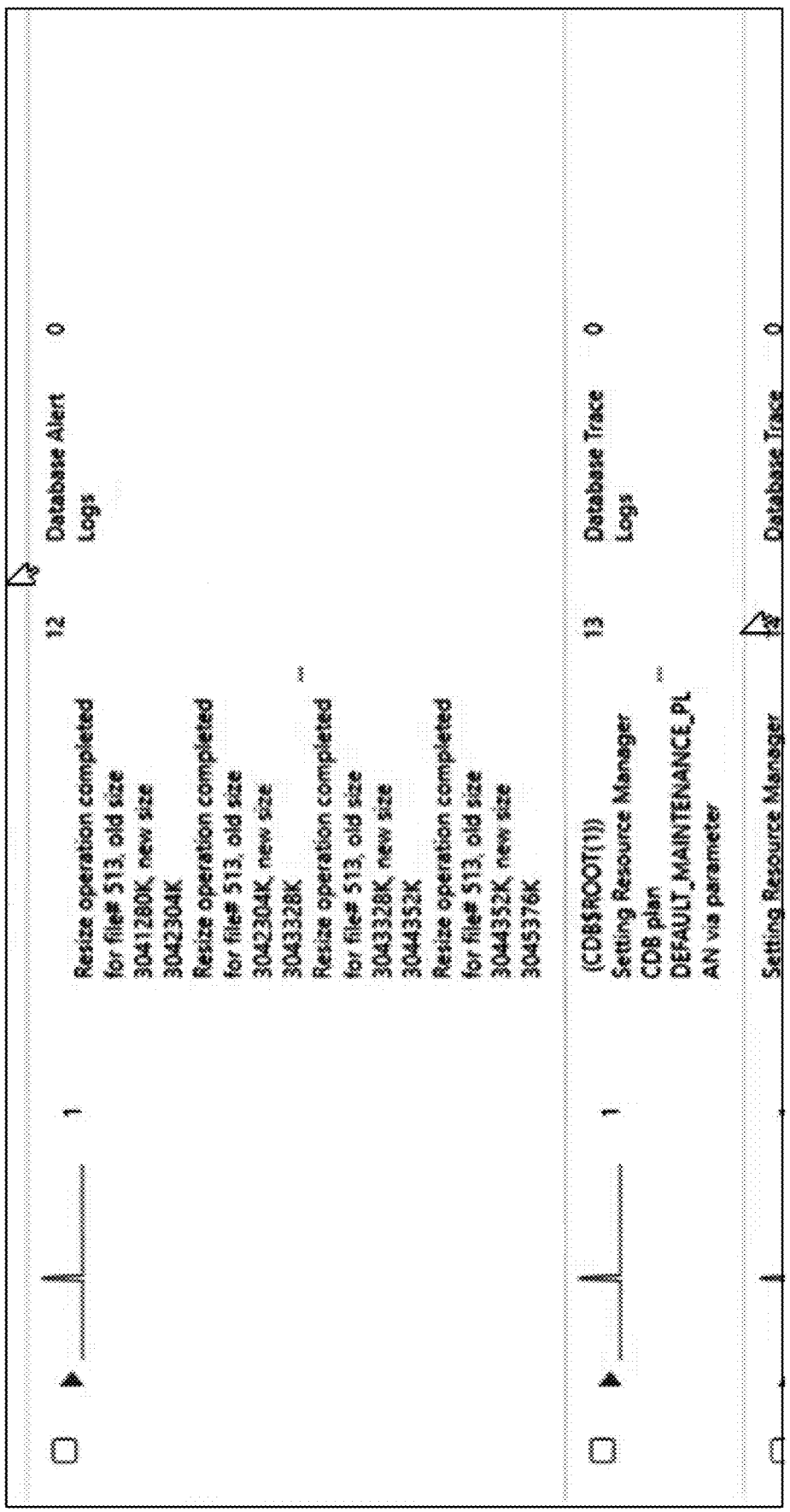
FIG. 10 shows an example of a result of scrolling down through the detail area in the response of FIG. 9, according to certain embodiments of the present disclosure.

FIG. 10 shows an example of a result of scrolling down (e.g., by the user, using an input device of the user station) through the detail area 920 in the response of FIG. 9 to the entry for the twelfth cluster, which indicates the root cause of the error message 'ReadFile failed Connection refused' that is indicated above with reference to FIG. 6. The sample message and log source for this entry indicate that the issue was actually caused by a maintenance operation on the database (specifically, a resize operation), which would have caused the failure of any request coming in while the operation was in progress.

Figure 11:
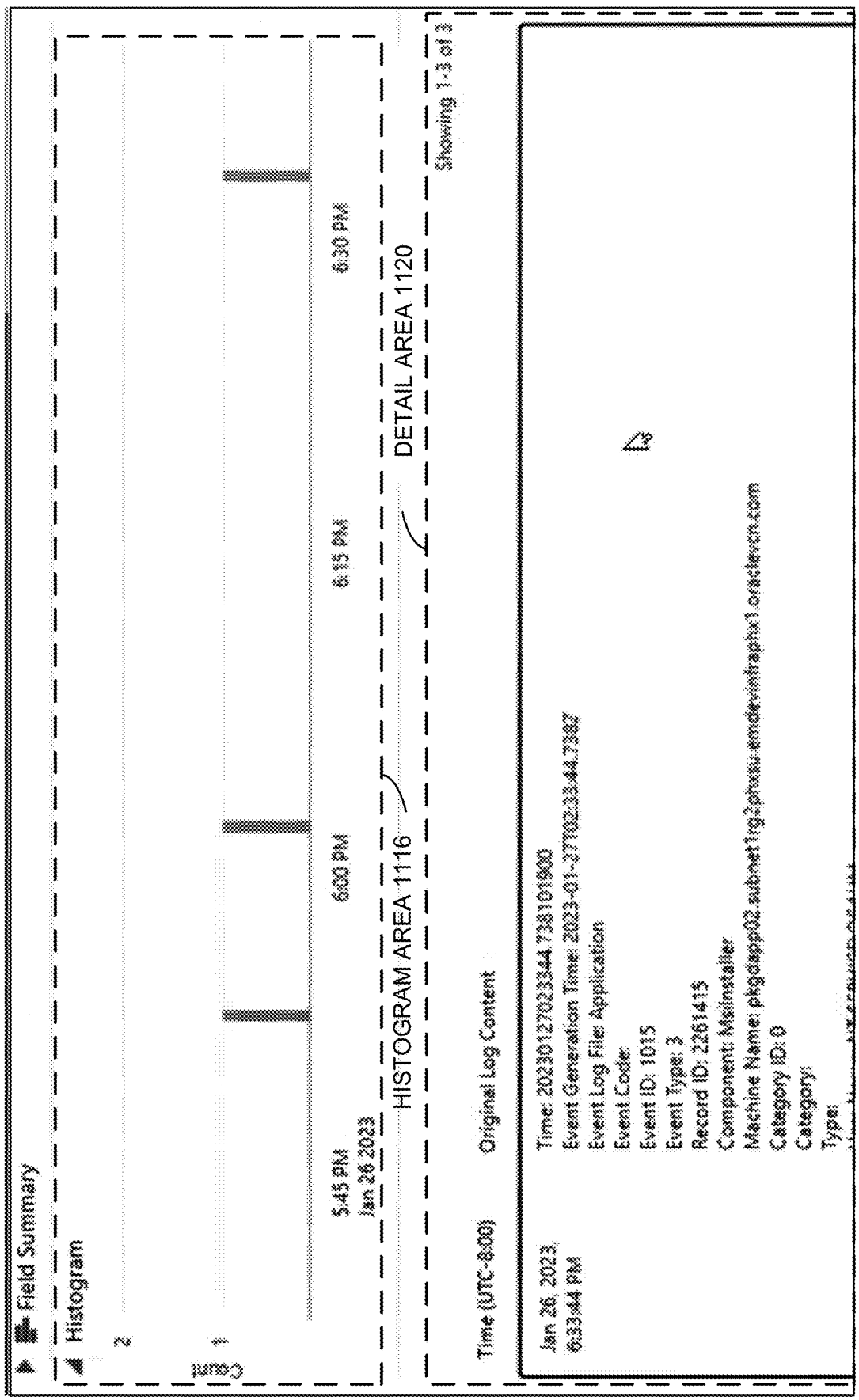
FIG. 11 shows histogram and detail areas of an example of a display of a response by a log analytics system to a query, according to certain embodiments of the present disclosure.

A second example of a root cause analysis using log analytics is now discussed with reference to FIGS. 11-14. FIG. 11 shows an example of a user interface display (including a histogram area 1116 and a detail area 1120) of a response by the log analytics system to a query on the message portion 'Failed to connect to server. Error:' over the time period from 5:40 PM to 6:40 PM on Jan. 26, 2023. In one example, the user enters the following query:

'Failed to connect to server. Error:' and specifies the time period in another element of the user interface display (e.g., as described above with reference to FIG. 5). The response indicates that three matching messages were found among the log files. The display also shows that the shape described by the data points of the time series signal that represents a time distribution of the timestamps of these messages is different than the one in the example as shown in FIG. 6. In this case, the messages were generated at different times, rather than all at the same time as in the previous example.

FIG. 12 shows an example of a detail area of a display of a response by the log analytics system to a query, as described with reference to FIG. 11, to which a command to activate an expansion functionality as described above has been added. For example, the query may appear as follows:

'Failed to connect to server. Error:'|addinsights

In this example, the first list item in the response as shown in FIG. 11 has been expanded to show corresponding values for the following parameters: cluster record count, shape record count, shape cluster count, issue, and cluster trend.

Figure 13:
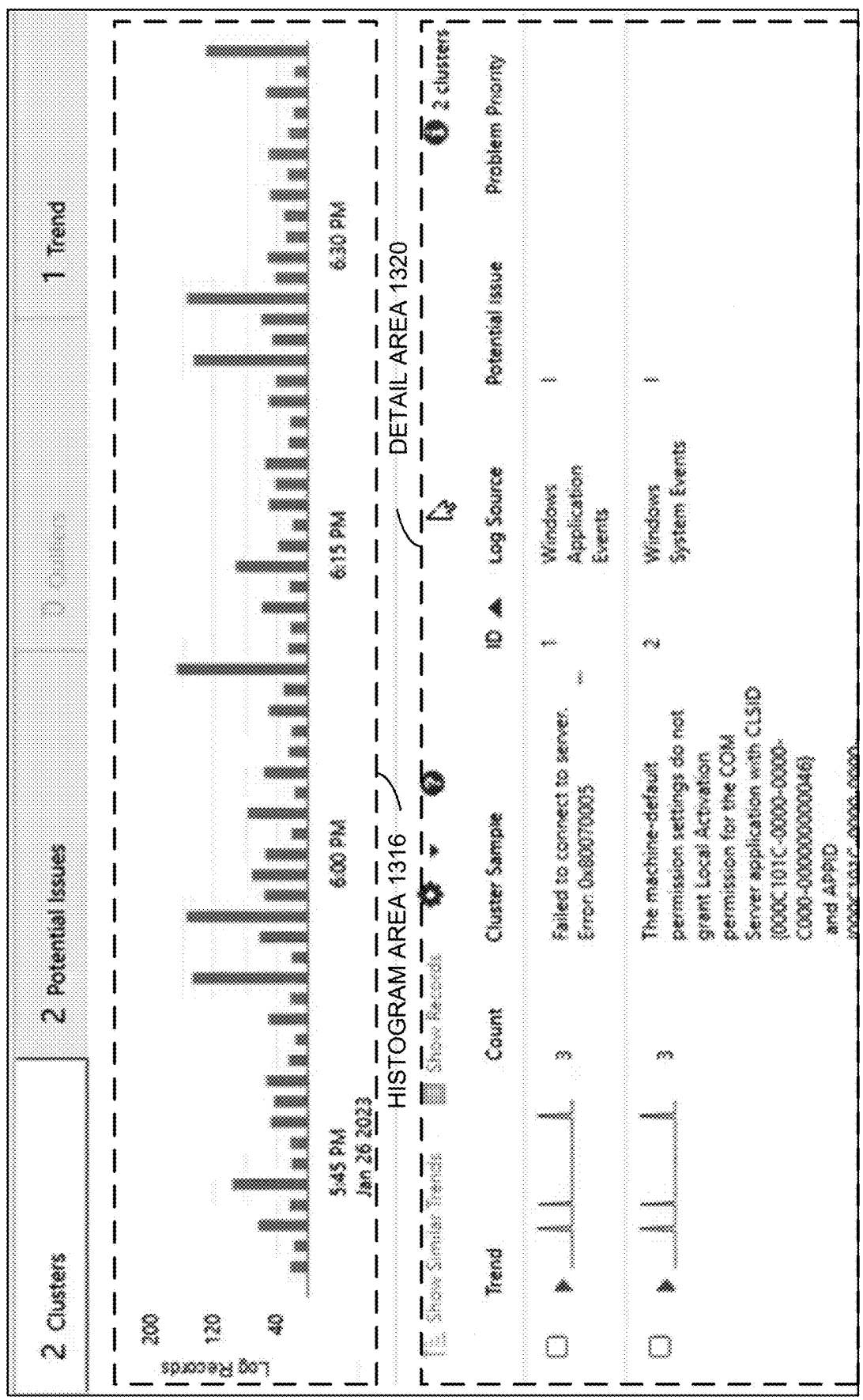
FIG. 13 shows histogram and detail areas of an example of a display of a response by a log analytics system to a query, according to certain embodiments of the present disclosure.

FIG. 13 shows an example of a display (including a histogram area 1316 and a detail area 1320) of a response by the log analytics system to a query, over all log records having timestamps within the same specified time period, on the shape identification value associated with the sparkline shown in FIG. 12. In this example, the query also includes a command to cluster the results as described above, and the query may appear as follows:

> *| cluster | where 'Shape ID' = −184986172

The user interface may be configured to add the shape identification value to the query automatically in response to a click by the user on the sparkline (e.g., as shown in FIG. 12).

Figure 14:
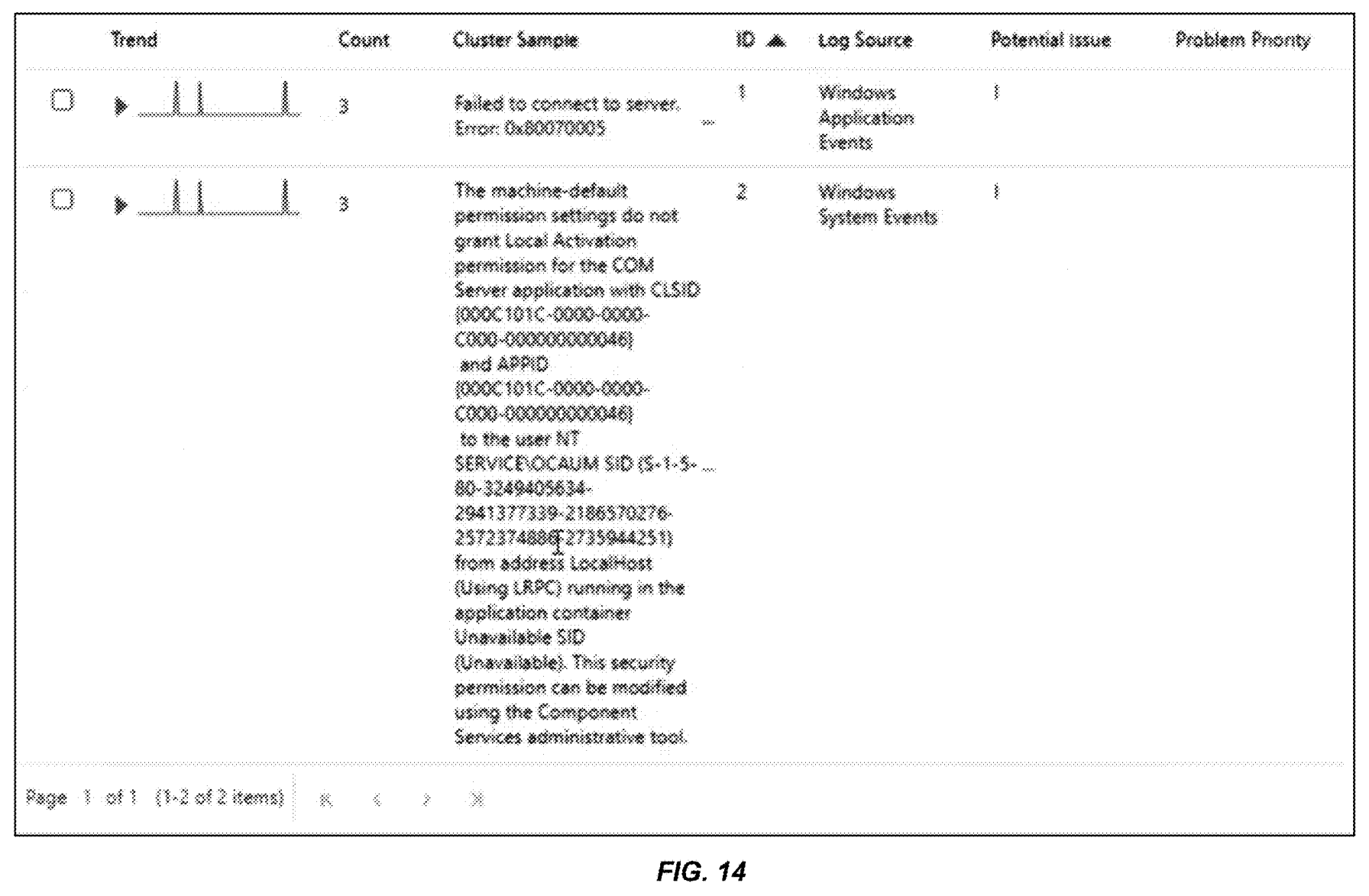

The response in FIG. 13 indicates that another cluster having the same shape identification value has been found within the specified time period. FIG. 14 shows another portion of the detail area 1320 which displays the message of the second cluster in more detail. To the user of the log analytics system, this information indicates that the root cause of the failure to connect was a security permission setting. It can be seen that this message is completely different than the message in the initial query whose results are shown in FIG. 11. Moreover, the two messages originated from different sources: one is from Windows Application Events, and the other is from Windows System Events. Because these two messages have no apparent relation to one another, it is unlikely that the root cause could have been determined efficiently without the use of shape identification values as described herein.

As discussed above, techniques disclosed herein include providing a shape identification value that characterizes a shape described by the data points of a time series signal over some time period. Such techniques may be implemented, for example, to provide a shape identification value for a time series signal that is compact, numeric, unique to the shape being characterized, and reproducible given the same time series signal.

Examples of algorithms that a log analytics system and/or agents as described above may execute to calculate a shape identification value are now described in further detail with reference to FIGS. 15-19. Although such algorithms may be used to calculate a shape identification value for log analytics applications as described above, shape identification value determination as described herein may also be employed without limitation in other applications involving time series analysis as well (e.g., applications that may require comparison and/or correlation among time series signals). Although applications to analyzing log records are described herein, for example, applications of shape identification value determination to processing of other types of data are further contemplated. Such data may include (for example) electronic files (e.g., document, spreadsheets, or image files) and/or communications (e.g., posts onto a website, SMS messages, or emails).

In another example, a Java server periodically logs the time taken for garbage collection (GC). This 'GC Time' can be plotted in a chart to learn the patterns of garbage collection over time for that server, which may be characterized using shape identification values. Similarly, certain background jobs may be run periodically, such that the timestamps of these jobs show a periodic behavior when plotted over time. For a user of a log analytics system, a display of predictable behavior is more likely to be distracting than helpful. To provide a improved user interface display, it may be desired to provide an option to use shape identification values to identify periodic behaviors and omit them from the display.

In a further example, a time series signal that has a long time duration in time is divided into portions of equal duration, and a corresponding shape identification value is computed for each of these portions of the time series signal. These shape identification values can then be used for very quick pattern searching in the history of the time series signal and/or for pattern recognition in the future of the time series signal.

As noted above, it may be desired for a shape identification value to be unique to the shape it characterizes. It may be desired for the shape identification value determination algorithm to preserve such uniqueness by returning different shape identification values for time series signals whose data points describe different shapes. In a practical application, however, two time series signals may be strongly correlated even though the shapes described by their respective data points differ slightly. Accordingly, it may also be desired for the shape identification value determination algorithm to accommodate such differences by returning the same shape identification value for time series signals whose data points describe similar shapes (e.g., to characterize shapes that are similar as being the same shape).

Two shapes may be considered to be similar if they share the same important features. Peaks and valleys are two examples of features of a time series signal that may be important to a shape described by the data points of the time series signal over the corresponding time period. A value s[i] of a time series signal s[1] to s[N] ($1<=i<=N$) may be identified as a peak if the value of s[i] is greater than the values of s[i−1] and s[i+1] (or is greater than either one of the values of s[i−1] or s[i+1], if the other one does not exist). Analogously, a value s[i] of a time series signal s[1] to s[N] ($1<=i<=N$) may be identified as a valley if the value of s[i] is less than the values of s[i−1] and s[i+1] (or is less than either one of the values of s[i−1] or s[i+1], if the other one does not exist).

In a typical case, not every peak or valley may be an important feature of a shape described by a set of data points. For example, a relatively low peak that has a markedly higher value than either of its neighbors may be an important feature of the shape, while a high peak that is separated from an even higher peak by only a shallow valley may be unimportant. In one example, the shape identification value determination algorithm uses a topological property called persistence to quantify the relative importance of peaks and valleys in a time series signal. The concept of persistence of a peak may be visualized using the analogy of a plot of a shape described by the data points of the time series signal as a structure that is initially completely covered with water, and then the water is permitted to drain away over some time such that the water level drops to reveal the structure. Using this analogy, the birth level of a peak may be considered as the water level when the peak first emerges, and the death level of a peak may be considered as the water level at the moment when a path from the peak to a higher peak becomes completely uncovered. The persistence score of a peak may be defined as the difference between its birth level and its death level.

The concept of persistence of a valley may be visualized using the above analogy in reverse, in which a plot of a shape described by the data points of the time series signal is a structure that is initially dry, and then the water level rises over some time to cover the structure. Using this analogy, the birth level of a valley may be considered as the water level when the valley is first submerged, and the death level of a valley may be considered as the water level at the moment when a path from the valley to a lower valley becomes completely covered. Alternatively, the concept of persistence of a valley may be visualized by considering a mirror image (along the time axis) of a plot of the time series signal, such that the peaks become valleys and the valleys become peaks, and in this case the same water-draining analogy used above to visualize peak persistence will hold true for valley persistence. The persistence score of a valley may be defined as the (absolute) difference between its birth level and its death level.

The shape identification value determination algorithm may be configured to calculate a shape identification value for a time series signal based on a persistence score signal of the time series signal. A description of persistent topology and an algorithm for computing a persistent homology may be found at https://www.sthu.org/blog/13-perstopology-peakdetection/index.html ("Persistent Topology for Peak Detection"). Examples of calculating persistence score signals are now discussed with reference to the time series signal ('Time series 1') shown in plot (A) of FIG. 15.

In one example, a peak persistence score signal for an input time series signal s[1] to s[N] may be calculated according to the following algorithm (where s[1] is the 'leftmost' value and s[N] is the 'rightmost' value):

Step 1) To calculate the peak persistence score signal, process each value s[i] of the time series signal s[1] to s[N] ($1 \le i \le N$) as follows, in descending order of magnitude:
  a) If both of s[i−1] and s[i+1] have not yet been processed (or one does not exist and the other one has not yet been processed), then s[i] is a peak. Add the time index [i] to the list of peaks and record the value s[i] as its birth level.
  b) Else if s[i−1] has already been processed and s[i+1] has not (or does not exist), then merge the index [i] with the nearest peak to its left.
  c) Else if s[i+1] has already been processed and s[i−1] has not (or does not exist), then merge the index [i] with the nearest peak to its right.
  d) Else if both of s[i−1] and s[i+1] have already been processed, then merge the peak nearest to the index [i] on its left with the peak nearest to the index [i] on its right, such that the peak which was born earlier is that one that survives. Record the value s[i] as the death level of the other peak.

Step 2) Calculate the persistence score of each peak in the list as [(birth level)−(death level)]. As the highest peak has no death level (and thus an unbounded persistence), its persistence score may be set to be equal to its birth level. Alternatively, the persistence score of the highest peak may be set to be equal to [(birth level)−(the lowest value in the time series signal s[1] to s[N])].

Figure 15:
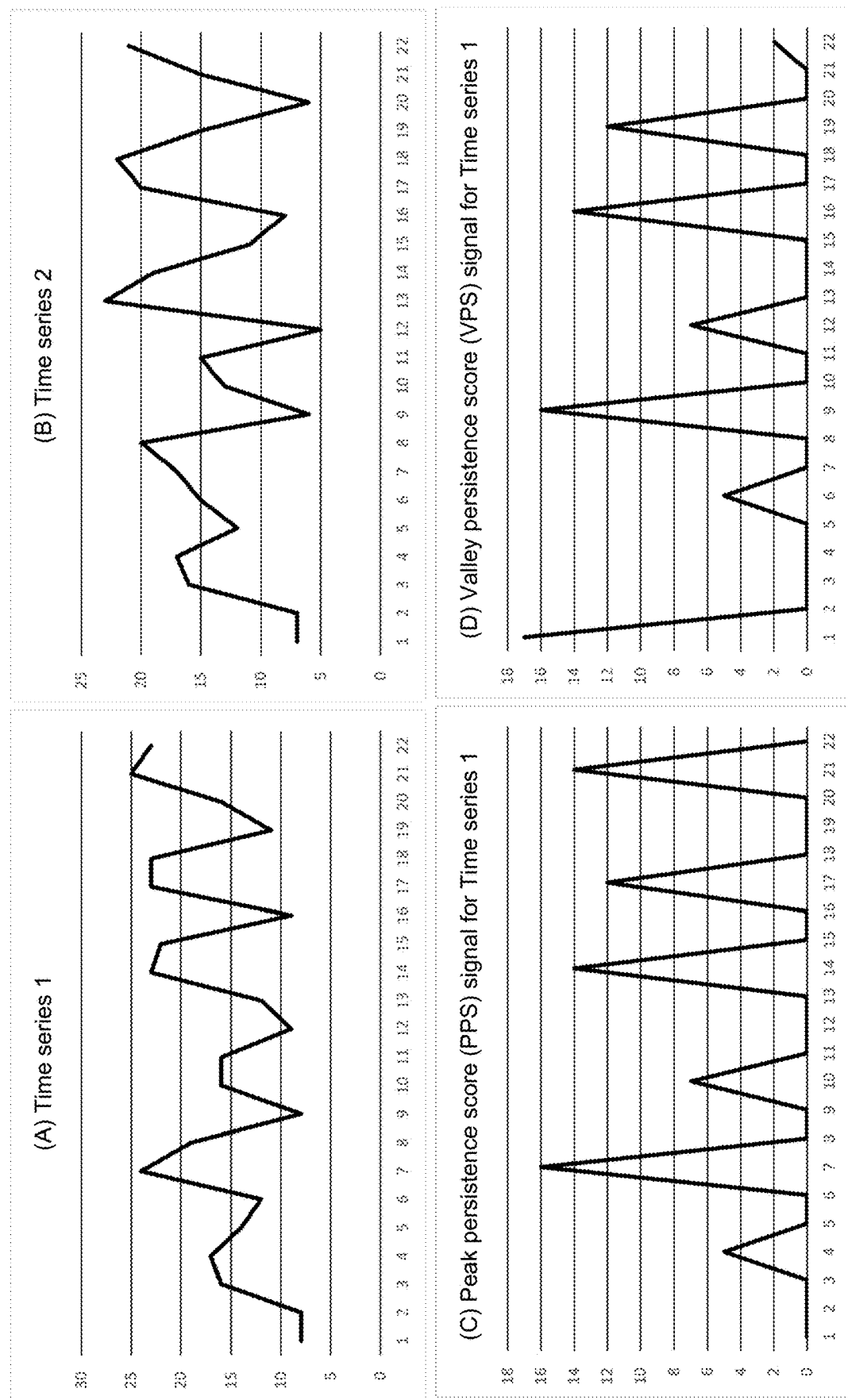
FIG. 15 shows examples of time series and persistence score signals, according to certain embodiments of the present disclosure.

An algorithm for calculating a peak persistence score signal as described above may be configured to return the peak persistence score signal as a time series signal p[1] to p[N], wherein each value p[i] ($1 \le i \le N$) is the corresponding peak persistence score if the index [i] is in the list of peaks, and zero otherwise. The plot I in FIG. 15 shows a peak persistence score (PPS) signal for Time series 1 as calculated using this algorithm. In one example, the shape identification value determination algorithm generates a shape identification value for the input time series signal (e.g., as an integer value, or as a long value for fewer collisions) by inputting the PPS signal as a key to a hash function (e.g., a version of the MurmurHash function).

As an alternative to, or in addition to, a peak persistence score signal as discussed above, the shape identification value determination algorithm may be configured to calculate a shape identification value for a time series signal based on a valley persistence score signal of the time series signal. In one example, a valley persistence score signal for an input time series signal s[1] to s[N] may be calculated according to the following algorithm (where s[1] is the 'leftmost' value and s[N] is the 'rightmost' value):

Step 1) To calculate the valley persistence score signal, process each value s[i] of the time series signal s[1] to s[N] ($1 \le i \le N$) as follows, in ascending order of magnitude:
  a) If both of s[i−1] and s[i+1] have not yet been processed (or one does not exist and the other one has not yet been processed), then s[i] is a valley. Add the time index [i] to the list of valleys and record the value s[i] as its birth level.
  b) Else if s[i−1] has already been processed and s[i+1] has not (or does not exist), then merge the index [i] with the nearest valley to its left.
  c) Else if s[i+1] has already been processed and s[i−1] has not (or does not exist), then merge the index [i] with the nearest valley to its right.
  d) Else if both of s[i−1] and s[i+1] have already been processed, then merge the valley nearest to the index [i] on its left with the valley nearest to the index [i] on its right, such that the valley which was born earlier is that one that survives. Record the value s[i] as the death level of the other valley.

Step 2) Calculate the persistence score of each valley in the list as [(death level)−(birth level)]. As the lowest valley has no death level (and thus an unbounded persistence), its persistence score may be set to be equal to the negative of its birth level. Alternatively, the persistence score of the lowest valley may be set to be equal to [(the highest value in the time series signal s[1] to s[N])−(birth level)].

An algorithm for calculating a valley persistence score signal as described above may be configured to return the valley persistence score signal as a time series signal v[1] to v[N], wherein each value v[i] ($1 \le i \le N$) is the corresponding valley persistence score if the index [i] is in the list of valleys, and zero otherwise. The plot (D) in FIG. 15 shows a valley persistence score (VPS) signal for Time series 1 as calculated using this algorithm. In one example, the shape identification value determination algorithm generates a shape identification value for the time series signal (e.g., as an integer or long value) by inputting the VPS signal as a key to a hash function (e.g., a version of the MurmurHash function). In another example, the shape identification value determination algorithm generates a shape identification value for the input time series signal (e.g., as an integer or long value) by inputting a combination (e.g., a concatenation) of PPS and VPS signals for the time series as a key to a hash function (e.g., a version of the MurmurHash function).

Figure 16:
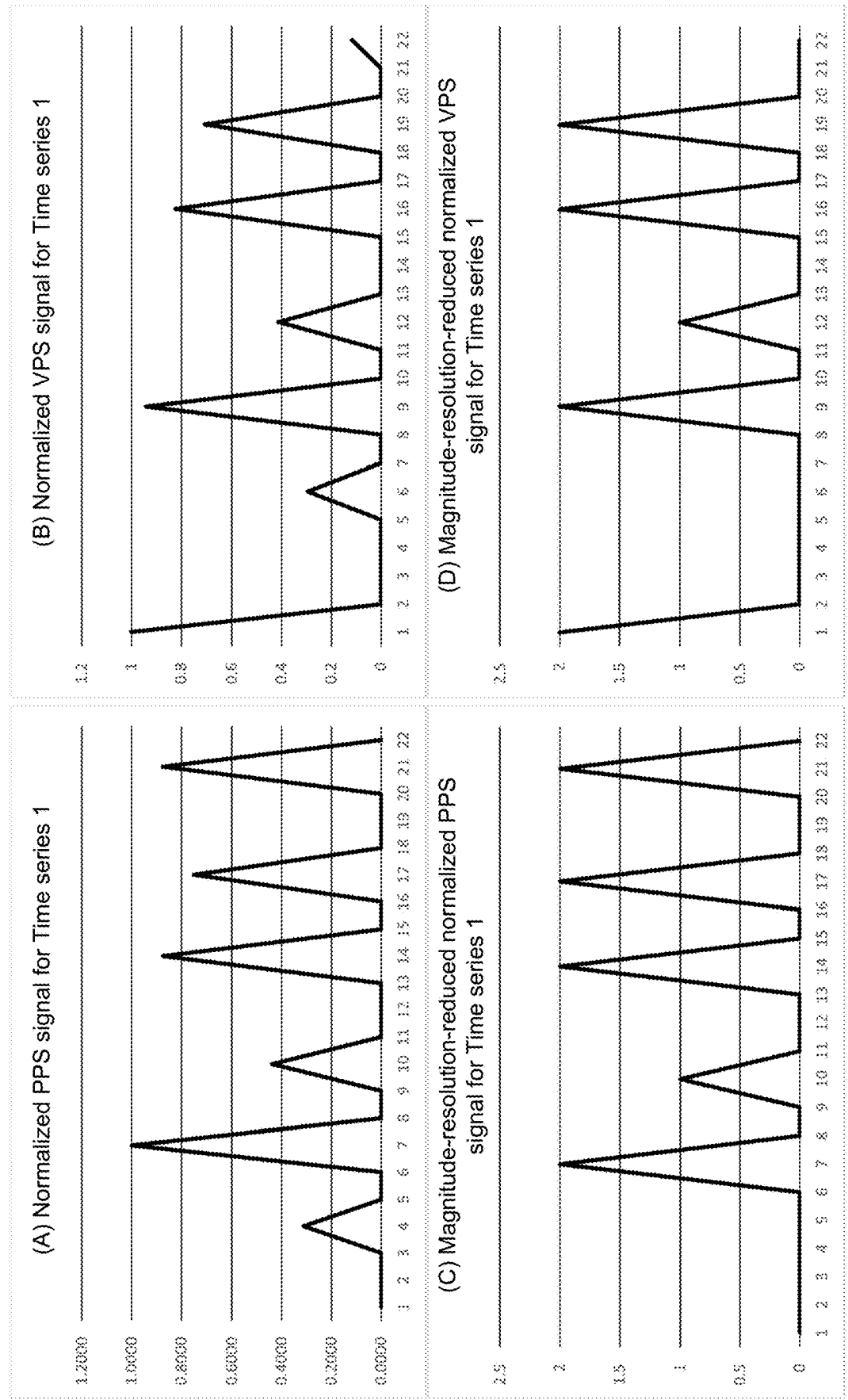
FIG. 16 shows examples of persistence score signals, according to certain embodiments of the present disclosure.

In some applications, a difference in scale between two time series signals may be irrelevant to a determination of whether the shapes described by their respective data points are similar. For such applications, it may be desired to configure the shape identification value determination algorithm to return the same shape identification value for each of two time series signals whose data points describe respective shapes that differ only in scale. In one such example, the shape identification value determination algorithm includes normalizing each persistence score signal (e.g., by normalizing the peak persistence score signal relative to its highest peak, and/or normalizing the valley persistence score signal relative to its lowest valley) before hashing (or before combining and hashing). The normalization may be performed such that the values of the persistence score signal are in the range of from zero to one after normalization. The plot (A) in FIG. 16 shows a result of normalizing the PPS signal shown in plot (C) of FIG. 15, and the plot (B) in FIG. 16 shows a result of normalizing the VPS signal shown in plot (D) of FIG. 15.

In some embodiments, the shape identification value determination algorithm may be configured to have some degree of tolerance to other minor differences between time series signals, such as minor variations in relative peak or valley magnitudes, or minor time shifts. Such a degree of tolerance may be based on a number of peaks and/or valleys in the time series signal being characterized.

Figure 17:
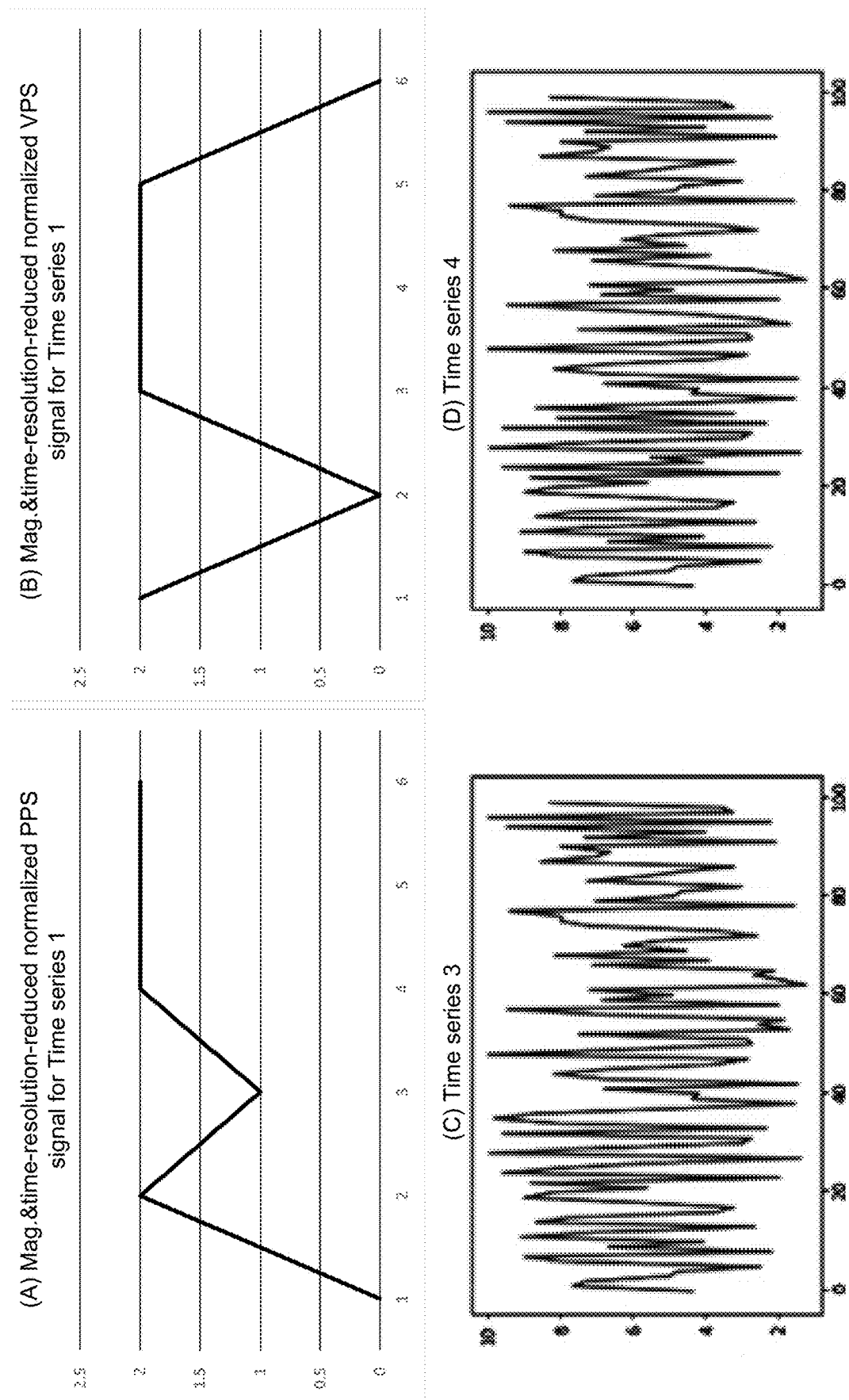
FIG. 17 shows examples of persistence score and time series signals, according to certain embodiments of the present disclosure.
Figure 18:
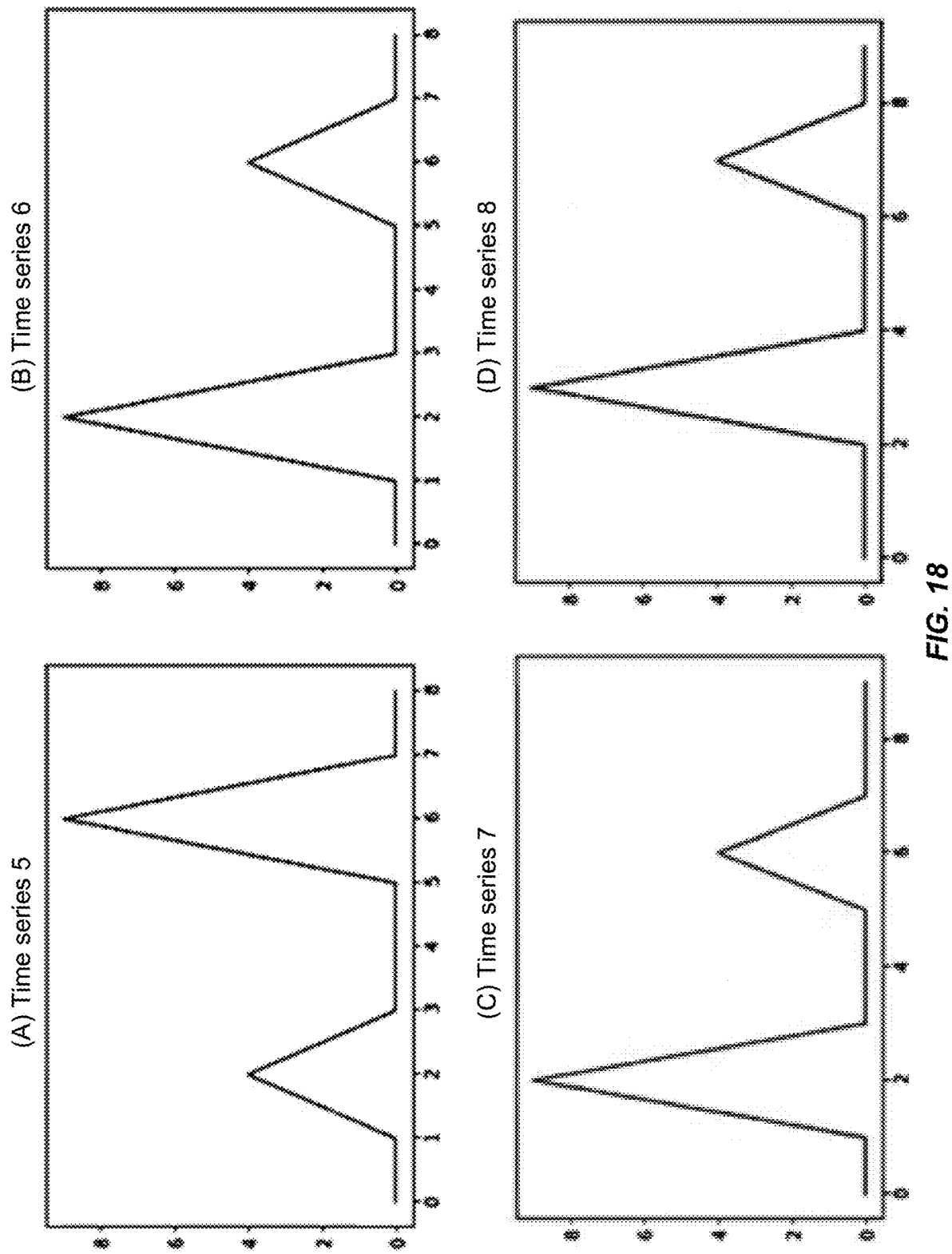
FIG. 18 shows examples of time series signals.

The time series signals shown in the plots (C) ('Time series 3') and (D) ('Time series 4') in FIG. 17 have many peaks and valleys. These time series signals differ considerably from one another at five peaks and valleys, but otherwise the shapes described by their respective data points are similar. For some applications, it may be desired for the shape identification value determination algorithm to characterize the respective shapes described by the data points of Time series 3 and Time series 4 as being the same. Conversely, each of the time series signals shown in the plots (A) ('Time series 5') and (B) ('Time series 6') in FIG. 18 have only two peaks, with one peak being twice the magnitude of the other. Although these peaks occur at the same points in time in the two time series signals, the relative order of the higher peak and the lower peak differs from one time series to the other. In this case, it may be desired for the shape identification value determination algorithm to return a different shape identification value for Time series 5 than for Time series 6.

In some applications, minor differences in relative peak or valley magnitudes from one time series signal to another may be insignificant to a determination of whether the shapes described by the respective data points of the two time series signals are similar. For such applications, it may be desired to configure the shape identification value determination algorithm to return the same shape identification value for each of two time series signals whose peaks and valleys have generally the same relative magnitudes as those of the other time series. In one such example, the shape identification value determination algorithm includes reducing the magnitude resolution of a peak persistence score signal, and/or reducing the magnitude resolution of a valley persistence score signal, before hashing (or before combining and hashing).

The shape identification value determination algorithm may be configured to use an operation such as the following to calculate, from each value p[i] of a persistence score signal p, a corresponding value q[i] of a signal q having a reduced resolution in magnitude:

$$q[i] = \text{int}(p[i] * \text{mag\_factor}),$$

where the function int(x) returns the integer value of x (e.g., discards the fractional value of x) and mag_factor is a factor that maps the values to p to a desired range of integer levels. Alternatively, the shape identification value determination algorithm may be configured to calculate the values q[i] of the signal q using the operation q[i]=round(p[i]*mag_factor). The value of mag_factor may be fixed or may be negatively monotonically related to the number of peaks and/or valleys in the persistence score signal p (e.g., such that the values of p are mapped to more integer levels for a signal having few peaks than for a signal having many peaks).

In an alternative formulation of the operation q[i]=int(p[i]*mag_factor) [or q[i]=round(p[i]*mag_factor)], mag_factor=10/mag_tol_level, and the value of mag_tol_level is positively monotonically related to the number of peaks and/or valleys. The plot (C) in FIG. 16 shows a result of using such an operation to reduce the magnitude resolution of the normalized PPS signal shown in plot (A) of FIG. 16, and the plot (D) in FIG. 16 shows a result of using such an operation to reduce the magnitude resolution of the normalized VPS signal shown in plot (B) of FIG. 16. In these examples, the value of mag_tol_level is 3.4 (three point four).

In some applications, the respective data points of two time series signals may be considered to describe the same shape even if the positions of the peaks and/or valleys vary slightly from one time series signal to the other. Additionally or alternatively, the respective data points of two time series signals may be considered to describe the same shape even if one of the time series signals is shifted in time slightly with reference to the other (e.g., as in the example of the time series signals shown in the plots (C) ('Time series 7') and (D) ('Time series 8') in FIG. 18). For such applications, it may be desired to configure the shape identification value determination algorithm to return the same shape identification value for each of the two time series signals. In one such example, the shape identification value determination algorithm includes reducing the time resolution of a peak persistence score signal, and/or reducing the time resolution of a valley persistence score signal, before hashing (or before combining and hashing).

To reduce the time resolution of a persistence score signal, the shape identification value determination algorithm may be configured to select the maximum among the values of the persistence score signal within a sliding time window of integer size time_tol. For example, the shape identification value determination algorithm may be configured to calculate, from a persistence score signal p, a signal r having a reduced resolution in time by executing a routine such as the following:

```
for j = 1 to ceil(N/time_tol);
    r[j] = p[j * time_tol];
    for i = 1 to (time_tol − 1);
        r[j] = max(r[j], p[(j * time_tol) − i]);
    end;
end;
``` where the ceiling function ceil(x) (also called the "least integer function") returns the value of the least integer equal to or greater than x.

The value of time_tol may be fixed or may be positively monotonically related to the number of peaks and/or valleys in the persistence score signal p (e.g., such that the sliding time window is more narrow for a signal having few peaks than for a signal having many peaks). The plot (A) in FIG. 17 shows a result of using such an operation to reduce the time resolution of the magnitude-resolution-reduced normalized PPS signal shown in plot (C) of FIG. 16, and the plot (B) in FIG. 17 shows a result of using such an operation to reduce the time resolution of the magnitude-resolution-reduced normalized VPS signal shown in plot (D) of FIG. 16. In these examples, the value of time_tol is 2 (two).

As noted above, the shape identification value determination algorithm may be configured to generate a shape identification value for the input time series signal by inputting a combination of PPS and VPS signals for the time series to a hash function. One example of such a combination of PPS and VPS signals is now described with reference to the reduced signals for Time series 1 that are shown in plots (A) and (B) of FIG. 17. In a first step, the values of each signal are labeled as peak or valley. This first step produces, for example, the string [0p, 2p, 1p, 2p, 2p, 2p] for the PPS signal in plot (A) and the string [2v, 0v, 2v, 2v, 2v, 0v] for the VPS signal in plot (B). In a second step, the labeled values are arranged into a single string in order of time. This second step produces, for example, the string [0p2v2p0v1p2v2p2v2p2v2p0v], which may be returned by the algorithm as the shape identification value or, alternatively, may be inputted as a key to a hash function (e.g., a version of the MurmurHash function) to generate the shape identification value. In one example, inputting the string [0p2v2p0v1p2v2p2v2p2v2p0v] to a implementation of the 32-bit MurmurHash2 function produces a value of 1882512862.

Plot (B) in FIG. 15 shows an example of a time series signal 'Time series 2' whose data points may be considered in some applications (e.g., a log analytics application) to describe a shape that is similar to the shape described by the data points of Time series 1 as shown in plot (A) in FIG. 15. An example is now described in which an implementation of the shape identification value determination algorithm that includes tolerance techniques as described above (e.g., normalization and resolution reduction) produces the same shape identification value for Time series 2 as for Time series 1.

Figure 19:
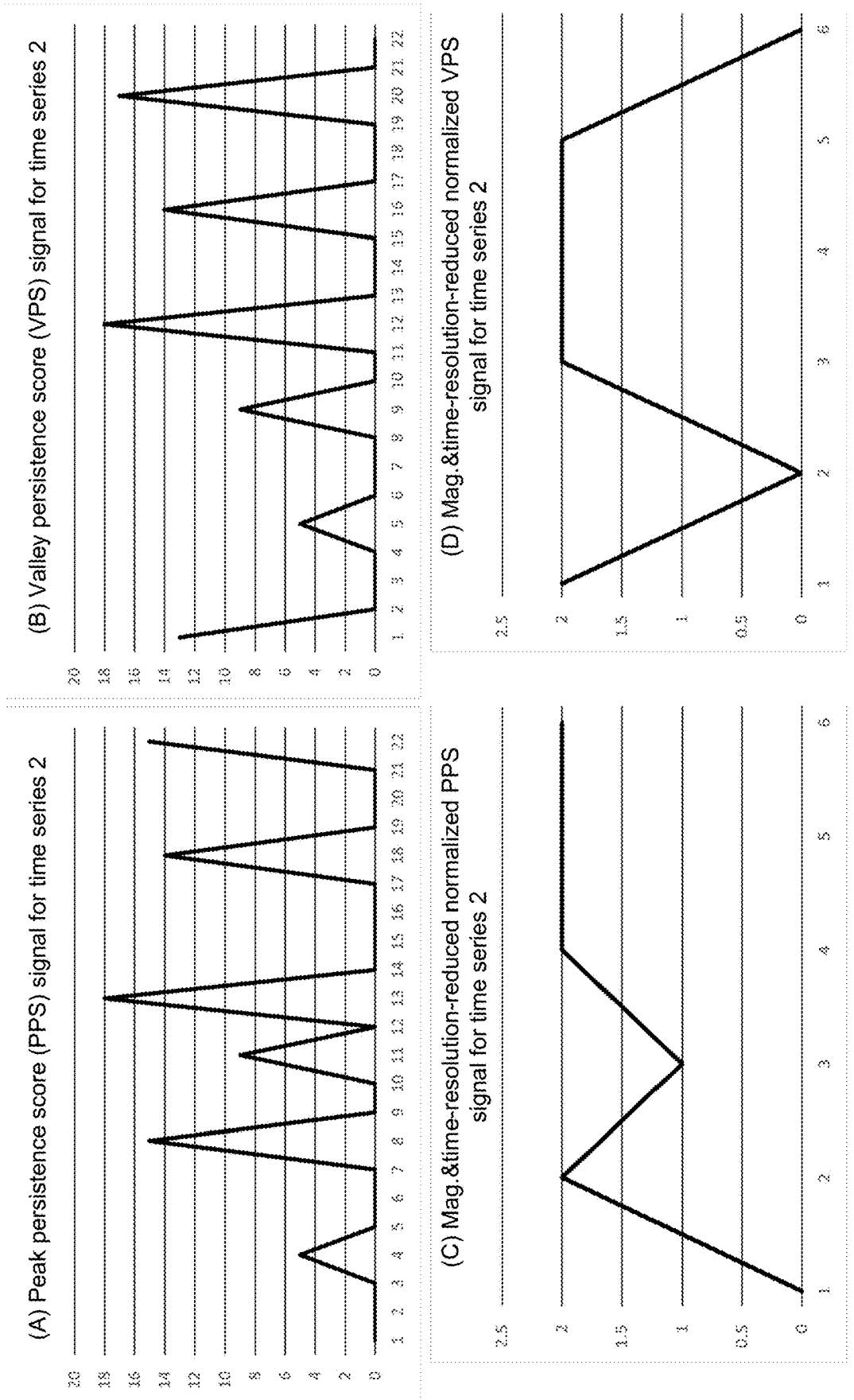
FIG. 19 shows examples of persistence score signals, according to certain embodiments of the present disclosure.

As discussed above, plots (C) and (D) of FIG. 15 show PPS and VPS signals, respectively, for Time series 1. Plots (A) and (B) of FIG. 19 show results of executing the same algorithms for calculating peak and valley persistence score signals to produce PPS and VPS signals, respectively, for Time series 2. Comparison of the PPS signals for Time series 1 and 2 shows an overall similarity in shape but some differences among the relative magnitudes and times of the various peaks in each signal, and likewise for comparison of the VPS signals for Time series 1 and 2.

As discussed above, plots (A) and (B) of FIG. 17 show PPS and VPS signals, respectively, for Time series 1 that are normalized and reduced in resolution in both magnitude and time. Plots (C) and (D) of FIG. 19 show results of executing the same normalization and resolution reduction algorithms on the PPS and VPS signals, respectively, for Time series 2. As the results for Time series 2 as shown in these plots are identical to those for Time series 1, the hash function will produce the same shape identification value for Time series 2 as for Time series 1.

The particular implementation of the shape identification value determination algorithm used to produce the same shape identification value 1882512862 from each of the Time series 1 and Time series 2 signals (as shown in plots (A) and (B), respectively, of FIG. 15) as described above is now restated. For an input time series signal:

1) Calculate and normalize a peak persistence score (PPS) signal and a valley persistence score (VPS) signal of the input time series.
2) Reduce the resolutions of the normalized PPS and VPS signals in both magnitude and time.
3) Label each data point of the reduced signals to indicate whether it is from the reduced PPS signal or from the reduced VPS signal, and arrange the labeled data points into a single string in order of time.
4) Input the string as a key to a hash function (e.g., an implementation of the 32-bit MurmurHash2 function) to generate the shape identification value.

In some use cases, it may be desired to implement more than one degree of similarity for determining similarity among shapes described by the data points of respective time series signals. For example, it may be desired to apply a low similarity threshold for general sorting of time series signals by shape and a high similarity threshold for pairwise shape comparisons. For such use cases, an application may be configured to include two or more different versions of the shape identification value determination algorithm, each producing a different respective shape identification value for an input time series signal. The different versions may be implemented, for example, to have different respective levels of tolerance for magnitude difference and/or different respective levels of tolerance for time shift.

Systems depicted in some of the figures and/or otherwise described herein may be provided in various configurations. In some embodiments, the systems may be configured as a distributed system where one or more components of the system are distributed across one or more networks in a cloud computing system.

Figure 20:
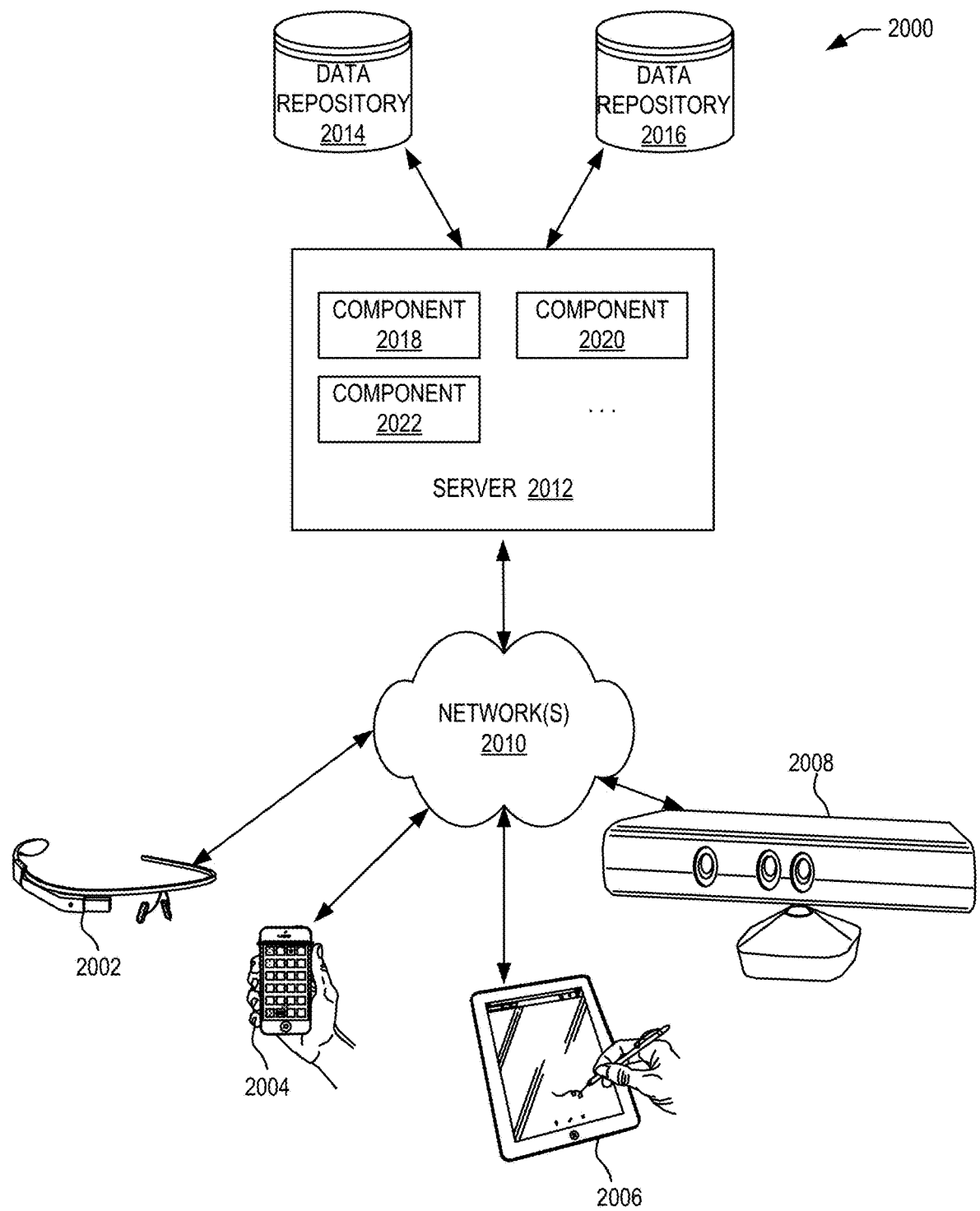
FIG. 20 depicts a simplified diagram of a distributed system for implementing some embodiments.

FIG. 20 depicts a simplified diagram of a distributed system 2000. In the illustrated example, distributed system 2000 includes one or more client computing devices 2002, 2004, 2006, and 2008, coupled to a server 2012 via one or more communication networks 2010. Client computing devices 2002, 2004, 2006, and 2008 may be configured to execute one or more applications.

In various examples, server 2012 may be adapted to run one or more services or software applications that enable one or more embodiments described in this disclosure. In certain examples, server 2012 may also provide other services or software applications that may include non-virtual and virtual environments. In some examples, these services (e.g., log analytics system 120) may be offered as web-based or cloud services, such as under a Software as a Service (SaaS) model to the users of client computing devices 2002, 2004, 2006, and/or 2008. Users operating client computing devices 2002, 2004, 2006, and/or 2008 may in turn utilize one or more client applications to interact with server 2012 to utilize the services provided by these components.

In the configuration depicted in FIG. 20, server 2012 may include one or more components 2018, 2020 and 2022 that implement the functions performed by server 2012. These components may include software components (e.g., components of log analytics system 120, such as query processing module 124, shape identification value determining module 128, shape identification value comparing module 132, and/or user interface module 136; components of a host, such as a source and/or an agent) that may be executed by one or more processors, hardware components, or combinations thereof. It should be appreciated that various different system configurations are possible, which may be different from distributed system 2000. The example shown in FIG. 20 is thus one example of a distributed system for implementing an example system and is not intended to be limiting.

Users may use client computing devices 2002, 2004, 2006, and/or 2008 to execute one or more applications, models or chatbots, which may generate one or more events or models that may then be implemented or serviced in accordance with the teachings of this disclosure. A client device may provide an interface that enables a user of the client device to interact with the client device. The client device may also output information to the user via this interface. Although FIG. 20 depicts only four client computing devices, any number of client computing devices may be supported.

The client devices may include various types of computing systems such as portable handheld devices, general purpose computers such as personal computers and laptops, workstation computers, wearable devices, gaming systems, thin clients, various messaging devices, sensors or other sensing devices, and the like. These computing devices may run various types and versions of software applications and operating systems (e.g., Microsoft Windows®, Apple Macintosh®, UNIX® or UNIX-like operating systems, Linux or Linux-like operating systems such as Google Chrome™ OS) including various mobile operating systems (e.g., Microsoft Windows Mobile®, iOS®, Windows Phone®, Android™, BlackBerry®, Palm OS®). Portable handheld devices may include cellular phones, smartphones, (e.g., an iPhone®), tablets (e.g., iPad®), personal digital assistants (PDAs), and the like. Wearable devices may include Google Glass® head mounted display, and other devices. Gaming systems may include various handheld gaming devices, Internet-enabled gaming devices (e.g., a Microsoft Xbox® gaming console with or without a Kinect® gesture input device, Sony PlayStation® system, various gaming systems provided by Nintendo®, and others), and the like. The client devices may be capable of executing various different applications such as various Internet-related apps, communication applications (e.g., E-mail applications, short message service (SMS) applications) and may use various communication protocols.

Network(s) 2010 may be any type of network familiar to those skilled in the art that may support data communications using any of a variety of available protocols, including without limitation TCP/IP (transmission control protocol/Internet protocol), SNA (systems network architecture), IPX (Internet packet exchange), AppleTalk®, and the like. Merely by way of example, network(s) 2010 may be a local area network (LAN), networks based on Ethernet, Token-Ring, a wide-area network (WAN), the Internet, a virtual network, a virtual private network (VPN), an intranet, an extranet, a public switched telephone network (PSTN), an infra-red network, a wireless network (e.g., a network operating under any of the Institute of Electrical and Electronics (IEEE) 1002.11 suite of protocols, Bluetooth®, and/or any other wireless protocol), and/or any combination of these and/or other networks.

Server 2012 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Server 2012 may include one or more virtual machines running virtual operating systems, or other computing architectures involving virtualization such as one or more flexible pools of logical storage devices that may be virtualized to maintain virtual storage devices for the server. In various examples, server 2012 may be adapted to run one or more services or software applications that provide the functionality described in the foregoing disclosure.

The computing systems in server 2012 may run one or more operating systems including any of those discussed above, as well as any commercially available server operating system. Server 2012 may also run any of a variety of additional server applications and/or mid-tier applications, including HTTP (hypertext transport protocol) servers, FTP (file transfer protocol) servers, CGI (common gateway interface) servers, JAVA® servers, database servers, and the like. Exemplary database servers include without limitation those commercially available from Oracle®, Microsoft®, Sybase®, IBM® (International Business Machines), and the like.

In some implementations, server 2012 may include one or more applications to analyze and consolidate data feeds and/or event updates received from users of client computing devices 2002, 2004, 2006, and 2008. As an example, data feeds and/or event updates may include, but are not limited to, Twitter® feeds, Facebook® updates or real-time updates received from one or more third party information sources and continuous data streams, which may include real-time events related to sensor data applications, financial tickers, network performance measuring tools (e.g., network monitoring and traffic management applications), click-stream analysis tools, automobile traffic monitoring, and the like. Server 2012 may also include one or more applications to display the data feeds and/or real-time events via one or more display devices of client computing devices 2002, 2004, 2006, and 2008. In some implementations, server 2012 may include a host or a log analytics system as described herein.

Distributed system 2000 may also include one or more data repositories 2014, 2016. These data repositories may be used to store data and other information in certain examples. For example, one or more of the data repositories 2014, 2016 may be used to store information such as information related to chatbot performance or generated models for use by chatbots used by server 2012 when performing various functions in accordance with various embodiments. Data repositories 2014, 2016 may reside in a variety of locations. For example, a data repository used by server 2012 may be local to server 2012 or may be remote from server 2012 and in communication with server 2012 via a network-based or dedicated connection. Data repositories 2014, 2016 may be of different types. In certain examples, a data repository used by server 2012 may be a database, for example, a relational database, such as databases provided by Oracle Corporation® and other vendors. One or more of these databases may be adapted to enable storage, update, and retrieval of data to and from the database in response to SQL-formatted commands. Databases 2014 and 2016 may include (for example) one or more log files as described herein.

In certain examples, one or more of data repositories 2014, 2016 may also be used by applications to store application data. The data repositories used by applications may be of different types such as, for example, a key-value store repository, an object store repository, or a general storage repository supported by a file system.

Figure 21:
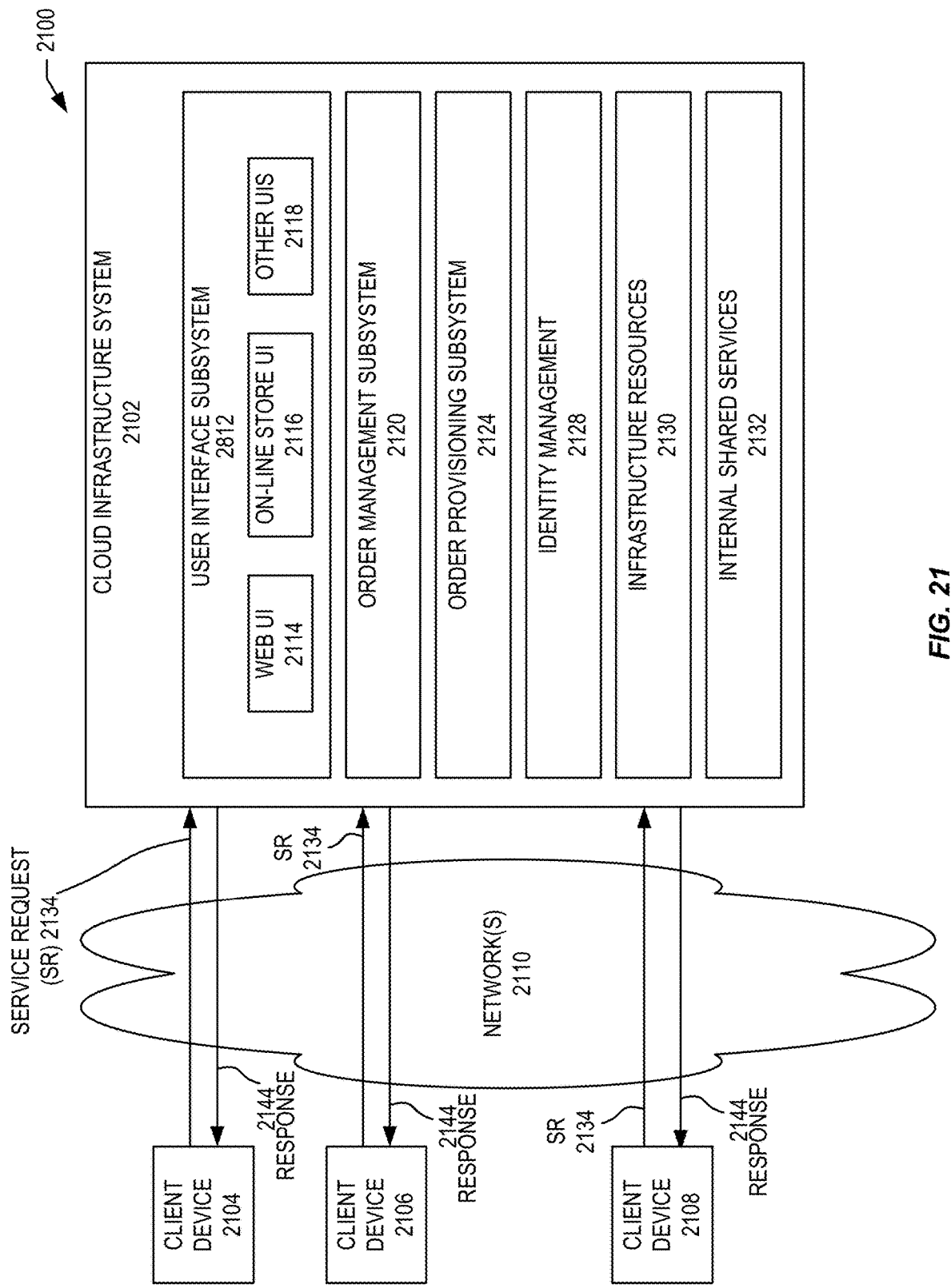
FIG. 21 is a simplified block diagram of one or more components of a system environment by which services provided by one or more components of an embodiment system may be offered as cloud services, in accordance with some embodiments.

In certain examples, the functionalities described in this disclosure may be offered as services via a cloud environment. FIG. 21 is a simplified block diagram of a cloud-based system environment in which various services may be offered as cloud services in accordance with certain examples. In the example depicted in FIG. 21, cloud infrastructure system 2102 may provide one or more cloud services that may be requested by users using one or more client computing devices 2104, 2106, and 2108. Cloud infrastructure system 2102 may comprise one or more computers and/or servers that may include those described above for server 2012. The computers in cloud infrastructure system 2102 may be organized as general purpose computers, specialized server computers, server farms, server clusters, or any other appropriate arrangement and/or combination.

Network(s) 2110 may facilitate communication and exchange of data between clients 2104, 2106, and 2108 and cloud infrastructure system 2102. Network(s) 2110 may include one or more networks. The networks may be of the same or different types. Network(s) 2110 may support one or more communication protocols, including wired and/or wireless protocols, for facilitating the communications.

The example depicted in FIG. 21 is only one example of a cloud infrastructure system and is not intended to be limiting. It should be appreciated that, in some other examples, cloud infrastructure system 2102 may have more or fewer components than those depicted in FIG. 21, may combine two or more components, or may have a different configuration or arrangement of components. For example, although FIG. 21 depicts three client computing devices, any number of client computing devices may be supported in alternative examples.

The term cloud service is generally used to refer to a service that is made available to users on demand and via a communication network such as the Internet by systems (e.g., cloud infrastructure system 2102) of a service provider. Typically, in a public cloud environment, servers and systems that make up the cloud service provider's system are different from the customer's own on-premise servers and systems. The cloud service provider's systems are managed by the cloud service provider. Customers may thus avail themselves of cloud services provided by a cloud service provider without having to purchase separate licenses, support, or hardware and software resources for the services. For example, a cloud service provider's system may host an application, and a user may, via the Internet, on demand, order and use the application without the user having to buy infrastructure resources for executing the application. Cloud services are designed to provide easy, scalable access to applications, resources and services. Several providers offer cloud services. For example, several cloud services are offered by Oracle Corporation® of Redwood Shores, California, such as middleware services, database services, Java cloud services, and others.

In certain examples, cloud infrastructure system 2102 may provide one or more cloud services using different models such as under a Software as a Service (SaaS) model, a Platform as a Service (PaaS) model, an Infrastructure as a Service (IaaS) model, and others, including hybrid service models. Cloud infrastructure system 2102 may include a suite of applications, middleware, databases, and other resources that enable provision of the various cloud services.

A SaaS model enables an application or software to be delivered to a customer over a communication network like the Internet, as a service, without the customer having to buy the hardware or software for the underlying application. For example, a SaaS model may be used to provide customers access to on-demand applications that are hosted by cloud infrastructure system 2102. Examples of SaaS services provided by Oracle Corporation® include, without limitation, various services for human resources/capital management, customer relationship management (CRM), enterprise resource planning (ERP), supply chain management (SCM), enterprise performance management (EPM), analytics services, social applications, and others.

An IaaS model is generally used to provide infrastructure resources (e.g., servers, storage, hardware and networking resources) to a customer as a cloud service to provide elastic compute and storage capabilities. Various IaaS services are provided by Oracle Corporation®.

A PaaS model is generally used to provide, as a service, platform and environment resources that enable customers to develop, run, and manage applications and services without the customer having to procure, build, or maintain such resources. Examples of PaaS services provided by Oracle Corporation® include, without limitation, Oracle Java Cloud Service (JCS), Oracle Database Cloud Service (DBCS), data management cloud service, various application development solutions services, and others.

Cloud services are generally provided on an on-demand self-service basis, subscription-based, elastically scalable, reliable, highly available, and secure manner. For example, a customer, via a subscription order, may order one or more services provided by cloud infrastructure system 2102. Cloud infrastructure system 2102 then performs processing to provide the services requested in the customer's subscription order. For example, a user may use utterances to request the cloud infrastructure system to take a certain action (e.g., an intent), as described above, and/or provide services for a chatbot system as described herein. Cloud infrastructure system 2102 may be configured to provide one or even multiple cloud services.

Cloud infrastructure system 2102 may provide the cloud services via different deployment models. In a public cloud model, cloud infrastructure system 2102 may be owned by a third party cloud services provider and the cloud services are offered to any general public customer, where the customer may be an individual or an enterprise. In certain other examples, under a private cloud model, cloud infrastructure system 2102 may be operated within an organization (e.g., within an enterprise organization) and services provided to customers that are within the organization. For example, the customers may be various departments of an enterprise such as the Human Resources department, the Payroll department, etc. or even individuals within the enterprise. In certain other examples, under a community cloud model, the cloud infrastructure system 2102 and the services provided may be shared by several organizations in a related community. Various other models such as hybrids of the above mentioned models may also be used.

Client computing devices 2104, 2106, and 2108 may be of different types (such as client computing devices 2002, 2004, 2006, and 2008 depicted in FIG. 20) and may be capable of operating one or more client applications. A user may use a client device to interact with cloud infrastructure system 2102, such as to request a service provided by cloud infrastructure system 2102. For example, a user may use a client device to request information or action from a chatbot as described in this disclosure.

In some examples, the processing performed by cloud infrastructure system 2102 for providing services may involve model training and deployment. This analysis may involve using, analyzing, and manipulating data sets to train and deploy one or more models. This analysis may be performed by one or more processors, possibly processing the data in parallel, performing simulations using the data, and the like. For example, big data analysis may be performed by cloud infrastructure system 2102 for generating and training one or more models for a chatbot system. The data used for this analysis may include structured data (e.g., data stored in a database or structured according to a structured model) and/or unstructured data (e.g., data blobs (binary large objects)).

As depicted in the example in FIG. 21, cloud infrastructure system 2102 may include infrastructure resources 2130 that are utilized for facilitating the provision of various cloud services offered by cloud infrastructure system 2102. Infrastructure resources 2130 may include, for example, processing resources, storage or memory resources, networking resources, and the like. In certain examples, the storage virtual machines that are available for servicing storage requested from applications may be part of cloud infrastructure system 2102. In other examples, the storage virtual machines may be part of different systems.

In certain examples, to facilitate efficient provisioning of these resources for supporting the various cloud services provided by cloud infrastructure system 2102 for different customers, the resources may be bundled into sets of resources or resource modules (also referred to as "pods"). Each resource module or pod may comprise a pre-integrated and optimized combination of resources of one or more types. In certain examples, different pods may be pre-provisioned for different types of cloud services. For example, a first set of pods may be provisioned for a database service, a second set of pods, which may include a different combination of resources than a pod in the first set of pods, may be provisioned for Java service, and the like. For some services, the resources allocated for provisioning the services may be shared between the services.

Cloud infrastructure system 2102 may itself internally use services 2132 that are shared by different components of cloud infrastructure system 2102 and which facilitate the provisioning of services by cloud infrastructure system 2102. These internal shared services may include, without limitation, a security and identity service, an integration service, an enterprise repository service, an enterprise manager service, a virus scanning and white list service, a high availability, backup and recovery service, service for enabling cloud support, an email service, a notification service, a file transfer service, and the like.

Cloud infrastructure system 2102 may comprise multiple subsystems. These subsystems may be implemented in software, or hardware, or combinations thereof. As depicted in FIG. 21, the subsystems may include a user interface subsystem 2112 that enables users or customers of cloud infrastructure system 2102 to interact with cloud infrastructure system 2102. User interface subsystem 2112 may include various different interfaces such as a web interface 2114, an online store interface 2116 where cloud services provided by cloud infrastructure system 2102 are advertised and are purchasable by a consumer, and other interfaces 2118. For example, a customer may, using a client device, request (service request 2134) one or more services provided by cloud infrastructure system 2102 using one or more of interfaces 2114, 2116, and 2118. For example, a customer may access the online store, browse cloud services offered by cloud infrastructure system 2102, and place a subscription order for one or more services offered by cloud infrastructure system 2102 that the customer wishes to subscribe to. The service request may include information identifying the customer and one or more services that the customer desires to subscribe to. For example, a customer may place a subscription order for a service offered by cloud infrastructure system 2102. As part of the order, the customer may provide information identifying a chatbot system for which the service is to be provided and optionally one or more credentials for the chatbot system.

In certain examples, such as the example depicted in FIG. 21, cloud infrastructure system 2102 may comprise an order management subsystem (OMS) 2120 that is configured to process the new order. As part of this processing, OMS 2120 may be configured to: create an account for the customer, if not done already; receive billing and/or accounting information from the customer that is to be used for billing the customer for providing the requested service to the customer; verify the customer information; upon verification, book the order for the customer; and orchestrate various workflows to prepare the order for provisioning.

Once properly validated, OMS 2120 may then invoke the order provisioning subsystem (OPS) 2124 that is configured to provision resources for the order including processing, memory, and networking resources. The provisioning may include allocating resources for the order and configuring the resources to facilitate the service requested by the customer order. The manner in which resources are provisioned for an order and the type of the provisioned resources may depend upon the type of cloud service that has been ordered by the customer. For example, according to one workflow, OPS 2124 may be configured to determine the particular cloud service being requested and identify a number of pods that may have been pre-configured for that particular cloud service. The number of pods that are allocated for an order may depend upon the size/amount/level/scope of the requested service. For example, the number of pods to be allocated may be determined based upon the number of users to be supported by the service, the duration of time for which the service is being requested, and the like. The allocated pods may then be customized for the particular requesting customer for providing the requested service.

In certain examples, setup phase processing, as described above, may be performed by cloud infrastructure system 2102 as part of the provisioning process. Cloud infrastructure system 2102 may generate an application ID and select a storage virtual machine for an application from among storage virtual machines provided by cloud infrastructure system 2102 itself or from storage virtual machines provided by other systems other than cloud infrastructure system 2102.

Cloud infrastructure system 2102 may send a response or notification 2144 to the requesting customer to indicate when the requested service is now ready for use. In some instances, information (e.g., a link) may be sent to the customer that enables the customer to start using and availing the benefits of the requested services. In certain examples, for a customer requesting the service, the response may include a chatbot system ID generated by cloud infrastructure system 2102 and information identifying a chatbot system selected by cloud infrastructure system 2102 for the chatbot system corresponding to the chatbot system ID.

Cloud infrastructure system 2102 may provide services to multiple customers. For each customer, cloud infrastructure system 2102 is responsible for managing information related to one or more subscription orders received from the customer, maintaining customer data related to the orders, and providing the requested services to the customer. Cloud infrastructure system 2102 may also collect usage statistics regarding a customer's use of subscribed services. For example, statistics may be collected for the amount of storage used, the amount of data transferred, the number of users, and the amount of system up time and system down time, and the like. This usage information may be used to bill the customer. Billing may be done, for example, on a monthly cycle.

Cloud infrastructure system 2102 may provide services to multiple customers in parallel. Cloud infrastructure system 2102 may store information for these customers, including possibly proprietary information. In certain examples, cloud infrastructure system 2102 comprises an identity management subsystem (IMS) 2128 that is configured to manage customer information and provide the separation of the managed information such that information related to one customer is not accessible by another customer. IMS 2128 may be configured to provide various security-related services such as identity services, such as information access management, authentication and authorization services, services for managing customer identities and roles and related capabilities, and the like.

Figure 22:
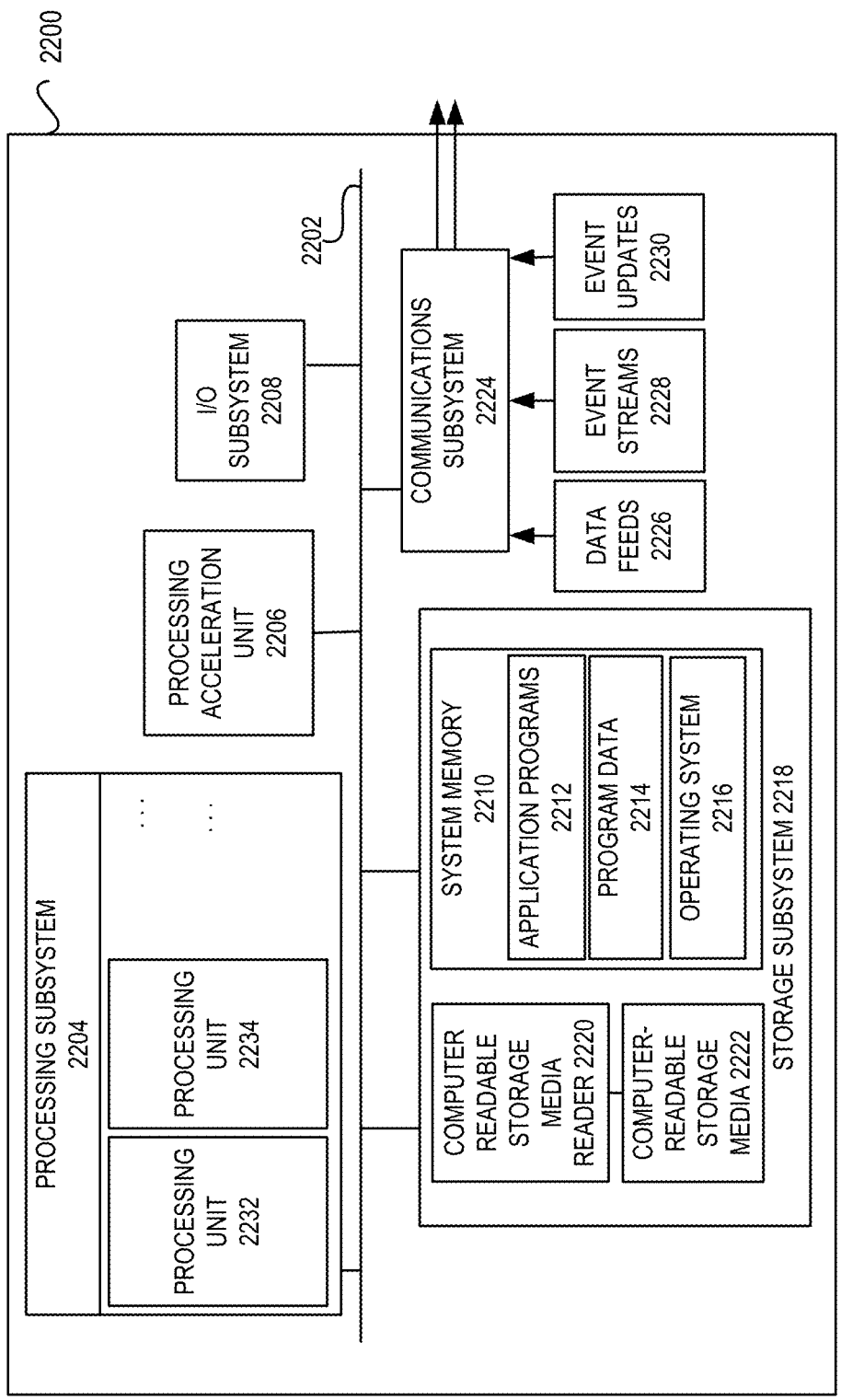
FIG. 22 illustrates an exemplary computer system, in which some embodiments of the present disclosure may be implemented.

FIG. 22 illustrates an example of computer system 2200. In some examples, computer system 2200 may be used to implement any of the digital assistant or chatbot systems within a distributed environment, and various servers and computer systems described above. As shown in FIG. 22, computer system 2200 includes various subsystems including a processing subsystem 2204 that communicates with a number of other subsystems via a bus subsystem 2202. These other subsystems may include a processing acceleration unit 2206, an I/O subsystem 2208, a storage subsystem 2218, and a communications subsystem 2224. Storage subsystem 2218 may include non-transitory computer-readable storage media including storage media 2222 and a system memory 2210.

Bus subsystem 2202 provides a mechanism for letting the various components and subsystems of computer system 2200 communicate with each other as intended. Although bus subsystem 2202 is shown schematically as a single bus, alternative examples of the bus subsystem may utilize multiple buses. Bus subsystem 2202 may be any of several types of bus structures including a memory bus or memory controller, a peripheral bus, a local bus using any of a variety of bus architectures, and the like. For example, such architectures may include an Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus, which may be implemented as a Mezzanine bus manufactured to the IEEE P13156.1 standard, and the like.

Processing subsystem 2204 controls the operation of computer system 2200 and may comprise one or more processors, application specific integrated circuits (ASICs), or field programmable gate arrays (FPGAs). The processors may include be single core or multicore processors. The processing resources of computer system 2200 may be organized into one or more processing units 2232, 2234, etc. A processing unit may include one or more processors, one or more cores from the same or different processors, a combination of cores and processors, or other combinations of cores and processors. In some examples, processing subsystem 2204 may include one or more special purpose co-processors such as graphics processors, digital signal processors (DSPs), or the like. In some examples, some or all of the processing units of processing subsystem 2204 may be implemented using customized circuits, such as application specific integrated circuits (ASICs), or field programmable gate arrays (FPGAs).

In some examples, the processing units in processing subsystem 2204 may execute instructions stored in system memory 2210 or on computer readable storage media 2222. In various examples, the processing units may execute a variety of programs or code instructions and may maintain multiple concurrently executing programs or processes. At any given time, some or all of the program code to be executed may be resident in system memory 2210 and/or on computer-readable storage media 2222 including potentially on one or more storage devices. Through suitable programming, processing subsystem 2204 may provide various functionalities described above. In instances where computer system 2200 is executing one or more virtual machines, one or more processing units may be allocated to each virtual machine.

In certain examples, a processing acceleration unit 2206 may optionally be provided for performing customized processing or for off-loading some of the processing performed by processing subsystem 2204 so as to accelerate the overall processing performed by computer system 2200.

I/O subsystem 2208 may include devices and mechanisms for inputting information to computer system 2200 and/or for outputting information from or via computer system 2200. In general, use of the term input device is intended to include all possible types of devices and mechanisms for inputting information to computer system 2200. User interface input devices may include, for example, a keyboard, pointing devices such as a mouse or trackball, a touchpad or touch screen incorporated into a display, a scroll wheel, a click wheel, a dial, a button, a switch, a keypad, audio input devices with voice command recognition systems, microphones, and other types of input devices. User interface input devices may also include motion sensing and/or gesture recognition devices such as the Microsoft Kinect® motion sensor that enables users to control and interact with an input device, the Microsoft Xbox® 360 game controller, devices that provide an interface for receiving input using gestures and spoken commands. User interface input devices may also include eye gesture recognition devices such as the Google Glass® blink detector that detects eye activity (e.g., "blinking" while taking pictures and/or making a menu selection) from users and transforms the eye gestures as inputs to an input device (e.g., Google Glass®). Additionally, user interface input devices may include voice recognition sensing devices that enable users to interact with voice recognition systems (e.g., Siri® navigator) through voice commands.

Other examples of user interface input devices include, without limitation, three dimensional (3D) mice, joysticks or pointing sticks, gamepads and graphic tablets, and audio/visual devices such as speakers, digital cameras, digital camcorders, portable media players, webcams, image scanners, fingerprint scanners, barcode reader 3D scanners, 3D printers, laser rangefinders, and eye gaze tracking devices. Additionally, user interface input devices may include, for example, medical imaging input devices such as computed tomography, magnetic resonance imaging, position emission tomography, and medical ultrasonography devices. User interface input devices may also include, for example, audio input devices such as MIDI keyboards, digital musical instruments and the like.

In general, use of the term output device is intended to include all possible types of devices and mechanisms for outputting information from computer system 2200 to a user or other computer. User interface output devices may include a display subsystem, indicator lights, or non-visual displays such as audio output devices, etc. The display subsystem may be a cathode ray tube (CRT), a flat-panel device, such as that using a liquid crystal display (LCD) or plasma display, a projection device, a touch screen, and the like. For example, user interface output devices may include, without limitation, a variety of display devices that visually convey text, graphics and audio/video information such as monitors, printers, speakers, headphones, automotive navigation systems, plotters, voice output devices, and modems.

Storage subsystem 2218 provides a repository or data store for storing information and data that is used by computer system 2200. Storage subsystem 2218 provides a tangible non-transitory computer-readable storage medium for storing the basic programming and data constructs that provide the functionality of some examples. Storage subsystem 2218 may store software (e.g., programs, code modules, instructions) that when executed by processing subsystem 2204 provides the functionality described above. The software may be executed by one or more processing units of processing subsystem 2204. Storage subsystem 2218 may also provide authentication in accordance with the teachings of this disclosure.

Storage subsystem 2218 may include one or more non-transitory memory devices, including volatile and non-volatile memory devices. As shown in FIG. 22, storage subsystem 2218 includes a system memory 2210 and a computer-readable storage media 2222. System memory 2210 may include a number of memories including a volatile main random access memory (RAM) for storage of instructions and data during program execution and a non-volatile read only memory (ROM) or flash memory in which fixed instructions are stored. In some implementations, a basic input/output system (BIOS), containing the basic routines that help to transfer information between elements within computer system 2200, such as during start-up, may typically be stored in the ROM. The RAM typically contains data and/or program modules that are presently being operated and executed by processing subsystem 2204. In some implementations, system memory 2210 may include multiple different types of memory, such as static random access memory (SRAM), dynamic random access memory (DRAM), and the like.

By way of example, and not limitation, as depicted in FIG. 22, system memory 2210 may load application programs 2212 that are being executed, which may include various applications such as Web browsers, mid-tier applications, relational database management systems (RDBMS), etc., program data 2214, and an operating system 2216. By way of example, operating system 2216 may include various versions of Microsoft Windows®, Apple Macintosh®, and/or Linux operating systems, a variety of commercially-available UNIX® or UNIX-like operating systems (including without limitation the variety of GNU/Linux operating systems, the Google Chrome® OS, and the like) and/or mobile operating systems such as iOS, Windows® Phone, Android® OS, BlackBerry® OS, Palm® OS operating systems, and others.

Computer-readable storage media 2222 may store programming and data constructs that provide the functionality of some examples. Computer-readable media 2222 may provide storage of computer-readable instructions, data structures, program modules, and other data for computer system 2200. Software (programs, code modules, instructions) that, when executed by processing subsystem 2204 provides the functionality described above, may be stored in storage subsystem 2218. By way of example, computer-readable storage media 2222 may include non-volatile memory such as a hard disk drive, a magnetic disk drive, an optical disk drive such as a CD ROM, DVD, a Blu-Ray® disk, or other optical media. Computer-readable storage media 2222 may include, but is not limited to, Zip® drives, flash memory cards, universal serial bus (USB) flash drives, secure digital (SD) cards, DVD disks, digital video tape, and the like. Computer-readable storage media 2222 may also include, solid-state drives (SSD) based on non-volatile memory such as flash-memory based SSDs, enterprise flash drives, solid state ROM, and the like, SSDs based on volatile memory such as solid state RAM, dynamic RAM, static RAM, DRAM-based SSDs, magnetoresistive RAM (MRAM) SSDs, and hybrid SSDs that use a combination of DRAM and flash memory based SSDs.

In certain examples, storage subsystem 2218 may also include a computer-readable storage media reader 2220 that may further be connected to computer-readable storage media 2222. Reader 2220 may receive and be configured to read data from a memory device such as a disk, a flash drive, etc.

In certain examples, computer system 2200 may support virtualization technologies, including but not limited to virtualization of processing and memory resources. For example, computer system 2200 may provide support for executing one or more virtual machines. In certain examples, computer system 2200 may execute a program such as a hypervisor that facilitated the configuring and managing of the virtual machines. Each virtual machine may be allocated memory, compute (e.g., processors, cores), I/O, and networking resources. Each virtual machine generally runs independently of the other virtual machines. A virtual machine typically runs its own operating system, which may be the same as or different from the operating systems executed by other virtual machines executed by computer system 2200. Accordingly, multiple operating systems may potentially be run concurrently by computer system 2200.

Communications subsystem 2224 provides an interface to other computer systems and networks. Communications subsystem 2224 serves as an interface for receiving data from and transmitting data to other systems from computer system 2200. For example, communications subsystem 2224 may enable computer system 2200 to establish a communication channel to one or more client devices via the Internet for receiving and sending information from and to the client devices. For example, when computer system 2200 is used to implement log analytics system 120 depicted in FIG. 1, the communication subsystem may be used to communicate with a plurality of agents 142-1 to 152-N. When computer system 2200 is used to implement an instance of one of the plurality of hosts 140-1 to 140-N depicted in FIG. 1, the communication subsystem may be used to communicate with others of the plurality of hosts, with end users of the network, and/or with log analytics system 120.

Communication subsystem 2224 may support both wired and/or wireless communication protocols. In certain examples, communications subsystem 2224 may include radio frequency (RF) transceiver components for accessing wireless voice and/or data networks (e.g., using cellular telephone technology, advanced data network technology, such as 3G, 4G or EDGE (enhanced data rates for global evolution), WiFi (IEEE 1502.XX family standards, or other mobile communication technologies, or any combination thereof), global positioning system (GPS) receiver components, and/or other components. In some examples, communications subsystem 2224 may provide wired network connectivity (e.g., Ethernet) in addition to or instead of a wireless interface.

Communication subsystem 2224 may receive and transmit data in various forms. In some examples, in addition to other forms, communications subsystem 2224 may receive input communications in the form of structured and/or unstructured data feeds 2226, event streams 2228, event updates 2230, and the like. For example, communications subsystem 2224 may be configured to receive (or send) data feeds 2226 in real-time from users of social media networks and/or other communication services such as Twitter® feeds, Facebook® updates, web feeds such as Rich Site Summary (RSS) feeds, and/or real-time updates from one or more third party information sources.

In certain examples, communications subsystem 2224 may be configured to receive data in the form of continuous data streams, which may include event streams 2228 of real-time events and/or event updates 2230, that may be continuous or unbounded in nature with no explicit end. Examples of applications that generate continuous data may include, for example, sensor data applications, financial tickers, network performance measuring tools (e.g. network monitoring and traffic management applications), clickstream analysis tools, automobile traffic monitoring, and the like.

Communications subsystem 2224 may also be configured to communicate data from computer system 2200 to other computer systems or networks. The data may be communicated in various different forms such as structured and/or unstructured data feeds 2226, event streams 2228, event updates 2230, and the like to one or more databases that may be in communication with one or more streaming data source computers coupled to computer system 2200.

Computer system 2200 may be one of various types, including a handheld portable device (e.g., an iPhone® cellular phone, an iPad® computing tablet, a PDA), a wearable device (e.g., a Google Glass® head mounted display), a personal computer, a workstation, a mainframe, a kiosk, a server rack, or any other data processing system. Due to the ever-changing nature of computers and networks, the description of computer system 2200 depicted in FIG. 22 is intended only as a specific example. Many other configurations having more or fewer components than the system depicted in FIG. 22 are possible. Based on the disclosure and teachings provided herein, it should be appreciate there are other ways and/or methods to implement the various examples.

Although specific examples have been described, various modifications, alterations, alternative constructions, and equivalents are possible. Examples are not restricted to operation within certain specific data processing environments, but are free to operate within a plurality of data processing environments. Additionally, although certain examples have been described using a particular series of transactions and steps, it should be apparent to those skilled in the art that this is not intended to be limiting. Although some flowcharts describe operations as a sequential process, many of the operations may be performed in parallel or concurrently. In addition, the order of the operations may be rearranged. A process may have additional steps not included in the figure. Various features and aspects of the above-described examples may be used individually or jointly.

Further, while certain examples have been described using a particular combination of hardware and software, it should be recognized that other combinations of hardware and software are also possible. Certain examples may be implemented only in hardware, or only in software, or using combinations thereof. The various processes described herein may be implemented on the same processor or different processors in any combination.

Where devices, systems, components or modules are described as being configured to perform certain operations or functions, such configuration may be accomplished, for example, by designing electronic circuits to perform the operation, by programming programmable electronic circuits (such as microprocessors) to perform the operation such as by executing computer instructions or code, or processors or cores programmed to execute code or instructions stored on a non-transitory memory medium, or any combination thereof. Processes may communicate using a variety of techniques including but not limited to conventional techniques for inter-process communications, and different pairs of processes may use different techniques, or the same pair of processes may use different techniques at different times.

Specific details are given in this disclosure to provide a thorough understanding of the examples. However, examples may be practiced without these specific details. For example, well-known circuits, processes, algorithms, structures, and techniques have been shown without unnecessary detail in order to avoid obscuring the examples. This description provides example examples only, and is not intended to limit the scope, applicability, or configuration of other examples. Rather, the preceding description of the examples will provide those skilled in the art with an enabling description for implementing various examples. Various changes may be made in the function and arrangement of elements.

The specification and drawings are, accordingly, to be regarded in an illustrative rather than a restrictive sense. It will, however, be evident that additions, subtractions, deletions, and other modifications and changes may be made thereunto without departing from the broader spirit and scope as set forth in the claims. Thus, although specific examples have been described, these are not intended to be limiting. Various modifications and equivalents are within the scope of the following claims.

In the foregoing specification, aspects of the disclosure are described with reference to specific examples thereof, but those skilled in the art will recognize that the disclosure is not limited thereto. Various features and aspects of the above-described disclosure may be used individually or jointly. Further, examples may be utilized in any number of environments and applications beyond those described herein without departing from the broader spirit and scope of the specification. The specification and drawings are, accordingly, to be regarded as illustrative rather than restrictive.

In the foregoing description, for the purposes of illustration, methods were described in a particular order. It should be appreciated that in alternate examples, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Where components are described as being configured to perform certain operations, such configuration may be accomplished, for example, by designing electronic circuits or other hardware to perform the operation, by programming programmable electronic circuits (e.g., microprocessors, or other suitable electronic circuits) to perform the operation, or any combination thereof.

While illustrative examples of the application have been described in detail herein, it is to be understood that the inventive concepts may be otherwise variously embodied and employed, and that the appended claims are intended to be construed to include such variations, except as limited by the prior art.

What is claimed is:

1. A computer-program product tangibly embodied in a non-transitory machine-readable storage medium, including instructions configured to cause one or more data processors to perform actions including:
   identifying a message portion and a time period;
   obtaining, from at least one of a plurality of log files, a first plurality of messages that include the message portion and have a timestamp within the time period;
   generating a first time series signal that represents a time distribution of the timestamps of the first plurality of messages;
   determining a first shape identification value that characterizes a shape described by data points of the first time series signal;
   for each message among a second plurality of messages:
      obtaining, from at least one of the plurality of log files, a corresponding plurality of instances of the message that have a timestamp within the time period;
      generating a corresponding time series signal that represents a time distribution of the timestamps of the plurality of instances of the message; and
      determining a shape identification value for the message that characterizes a shape described by data points of the corresponding time series signal; and
   for each of at least one message among the second plurality of messages:
      determining that a shape identification value for the message is the same as the first shape identification value; and
      in response to the determining, providing information identifying the message to a user interface.

2. The computer-program product as recited in claim 1, wherein the message portion comprises a text string.

3. The computer-program product as recited in claim 1, wherein each of the data points of the first time series signal corresponds to a respective time bin of a plurality of time bins and indicates a quantity of the timestamps of the first plurality of messages that are within the respective time bin.

4. The computer-program product as recited in claim 1, wherein:
   for one of the messages among the second plurality of messages, obtaining the corresponding plurality of instances of the message comprises obtaining the corresponding plurality of instances of the message from a first log file, and
   for another one of the messages among the second plurality of messages, obtaining the corresponding plurality of instances of the message comprises obtaining the corresponding plurality of instances of the message from a second log file that is separate from the first log file.

5. The computer-program product as recited in claim 1, wherein:
   determining the shape identification value for one of the messages among the second plurality of messages is performed at a first host, and
   determining the shape identification value for another one of the messages among the second plurality of messages is performed at a second host that is separate from the first host.

6. The computer-program product as recited in claim 1, wherein the first shape identification value is based on a persistence score signal of the first time series signal.

7. The computer-program product as recited in claim 6, wherein determining the first shape identification value comprises reducing a magnitude resolution of the persistence score signal, based on a number of peaks in the persistence score signal.

8. The computer-program product as recited in claim 6, wherein determining the first shape identification value comprises reducing a resolution of the persistence score signal in both magnitude and time, based on a number of peaks in the persistence score signal.

9. The computer-program product as recited in claim 6, wherein determining the first shape identification value comprises applying a hash function to a key that is based on the persistence score signal.

10. The computer-program product as recited in claim 1, wherein the first shape identification value is based on a peak persistence score signal of the first time series signal and a valley persistence score signal of the first time series signal.

11. A computer-implemented method of analyzing log records, the method comprising:
    identifying a text string and a time period;
    obtaining, from at least one of a plurality of log files, a first plurality of messages that include the text string and have a timestamp within the time period;
    generating a first time series signal that represents a time distribution of the timestamps of the first plurality of messages;
    determining a first shape identification value that characterizes a shape described by data points of the first time series signal;
    for each message among a second plurality of messages:
       obtaining, from at least one of the plurality of log files, a corresponding plurality of instances of the message that have a timestamp within the time period;
       generating a corresponding time series signal that represents a time distribution of the timestamps of the plurality of instances of the message; and
       determining a shape identification value for the message that characterizes a shape described by data points of the corresponding time series signal; and
    for each of at least one message among the second plurality of messages:
       determining that a shape identification value for the message is the same as the first shape identification value; and
       in response to the determining, providing information identifying the message to a user interface.

12. The computer-implemented method as recited in claim 11, wherein:
    determining the shape identification value for one of the messages among the second plurality of messages is performed at a first host, and
    determining the shape identification value for another one of the messages among the second plurality of messages is performed at a second host that is separate from the first host.

13. The computer-implemented method as recited in claim 11, wherein the first shape identification value is based on a persistence score signal of the first time series signal.

14. The computer-implemented method as recited in claim 13, wherein determining the first shape identification value comprises reducing a resolution of the persistence score signal in both magnitude and time, based on a number of peaks in the persistence score signal.

15. The computer-implemented method as recited in claim 11, wherein the first shape identification value is based on a peak persistence score signal of the first time series signal and a valley persistence score signal of the first time series signal.

16. A system comprising:
one or more data processors; and
a non-transitory computer readable storage medium containing instructions which, when executed on the one or more data processors, cause the one or more data processors to perform actions including:
identifying a text string and a time period;
obtaining, from at least one of a plurality of log files, a first plurality of messages that include the text string and have a timestamp within the time period;
generating a first time series signal that represents a time distribution of the timestamps of the first plurality of messages;
determining a first shape identification value that characterizes a shape described by data points of the first time series signal;
for each message among a second plurality of messages:
obtaining, from at least one of the plurality of log files, a corresponding plurality of instances of the message that have a timestamp within the time period;
generating a corresponding time series signal that represents a time distribution of the timestamps of the plurality of instances of the message; and
determining a shape identification value for the message that characterizes a shape described by data points of the corresponding time series signal; and
for each of at least one message among the second plurality of messages:
determining that a shape identification value for the message is the same as the first shape identification value; and
in response to the determining, providing information identifying the message to a user interface.

17. The system as recited in claim 16, wherein:
for one of the messages among the second plurality of messages, obtaining the corresponding plurality of instances of the message comprises obtaining the corresponding plurality of instances of the message from a first log file, and
for another one of the messages among the second plurality of messages, obtaining the corresponding plurality of instances of the message comprises obtaining the corresponding plurality of instances of the message from a second log file that is separate from the first log file.

18. The system as recited in claim 16, wherein:
determining the shape identification value for one of the messages among the second plurality of messages is performed at a first host, and
determining the shape identification value for another one of the messages among the second plurality of messages is performed at a second host that is separate from the first host.

19. The system as recited in claim 16, wherein:
the first shape identification value is based on a persistence score signal of the first time series signal, and
determining the first shape identification value comprises reducing a resolution of the persistence score signal, based on a number of peaks in the persistence score signal, in at least one of magnitude or time.

20. The system as recited in claim 16, wherein the first shape identification value is based on a peak persistence score signal of the first time series signal and a valley persistence score signal of the first time series signal.

* * * * *